US006664505B2

(12) United States Patent
Martin

(10) Patent No.: US 6,664,505 B2
(45) Date of Patent: Dec. 16, 2003

(54) LASER PROCESSING OF MATERIALS USING MATHEMATICAL TOOLS

(75) Inventor: Clarence H Martin, Gahanna, OH (US)

(73) Assignee: TechnoLines LLC, Toledo, OH (US)

( * ) Notice: Subject to any disclaimer, the term of this patent is extended or adjusted under 35 U.S.C. 154(b) by 88 days.

(21) Appl. No.: 09/730,497

(22) Filed: Dec. 5, 2000

(65) Prior Publication Data

US 2001/0037999 A1 Nov. 8, 2001

Related U.S. Application Data

(60) Provisional application No. 60/169,096, filed on Dec. 6, 1999.

(51) Int. Cl.[7] .............................................. B23K 26/00
(52) U.S. Cl. ............................ 219/121.85; 219/121.68; 700/166
(58) Field of Search ...................... 219/121.61, 121.68, 219/121.69, 121.85; 345/441; 700/166

(56) References Cited

U.S. PATENT DOCUMENTS 5,473,736 A * 12/1995 Young
5,831,633 A * 11/1998 Van Roy
5,990,444 A * 11/1999 Costin ................... 219/121.69
6,059,391 A * 5/2000 Fulkerson et al.
6,495,237 B1 * 12/2002 Costin
6,526,158 B1 * 2/2003 Goldberg

OTHER PUBLICATIONS

Wegner et al., "Fractals for Windows", 1992, Waite Group Press, pp. 128–140 and 265–268.*

* cited by examiner

*Primary Examiner*—Geoffrey S. Evans
(74) *Attorney, Agent, or Firm*—Scott C. Harris, Es

(57) ABSTRACT

A system of forming an image using mathematical tools. The images formed using any of the set of mathematical tools, which can be modular level sets, fractals, or cellular automata, or any other modular level set tool. Whenever tool is used, but parameters associated with the values in that tool can be set. This allows producing a number of different functions. The output of the tool is an image, which each pixel of the image having a color and each color representing some change that is to be carried out to the material being processed. The material being processed can be a textile material or denim for example. The processing device can be a laser which produces an output whose value is dependent on the different colors, with each color representing a power output or energy density per unit time specific to that color.

118 Claims, 22 Drawing Sheets

LASER PROCESSING OF MATERIALS USING MATHEMATICAL TOOLS

CROSS REFERENCE TO RELATED APPLICATIONS

This application claims the benefit of the U.S. Provisional Application No. 60/169,096, filed on Dec. 6, 1999.

BACKGROUND

Garments are conventionally processed to obtain specified looks on the garments. Denim materials, such as denim jeans, are often processed.

Denim is often processed using stone washing, enzyme washing, sandblasting, and other techniques. More modern techniques may include embroidery, and other pattern production.

U.S. Pat. Nos. 5,916,461, 5,9900,444, and others have described using a laser to simulate the looks that are conventionally produced by sandblasting and other conventional techniques. This has included simulating looks and patterns produced by local abrasion, a global abrasion, whiskers, and imprints. The patents have also described scribing decorative graphics obtained from clipart.

U.S. Pat. Nos. 5,916,461 and 6,002,099 describe using random processes to place various geometric objects into a drawing field. The user can control the drawing field to provide desired looks on the denim materials.

SUMMARY

The present application teaches additional tools and techniques intended for controlling a laser to produce an output beam that changes the look of a specified garment or material in a new way. One specific technique uses a mathematically-based process to automatically generate a pattern, or a portion of a pattern, which can be produced on either part or all of a specified garment.

Another aspect defines the specified mathematical techniques, which may include fractal techniques, modular level set techniques, cellular automata techniques, and specified iterative techniques.

BRIEF DESCRIPTION OF THE DRAWINGS

These and other aspects will now be described in detail with reference to the accompanying drawings, wherein.

DETAILED DESCRIPTION

Figure 1:
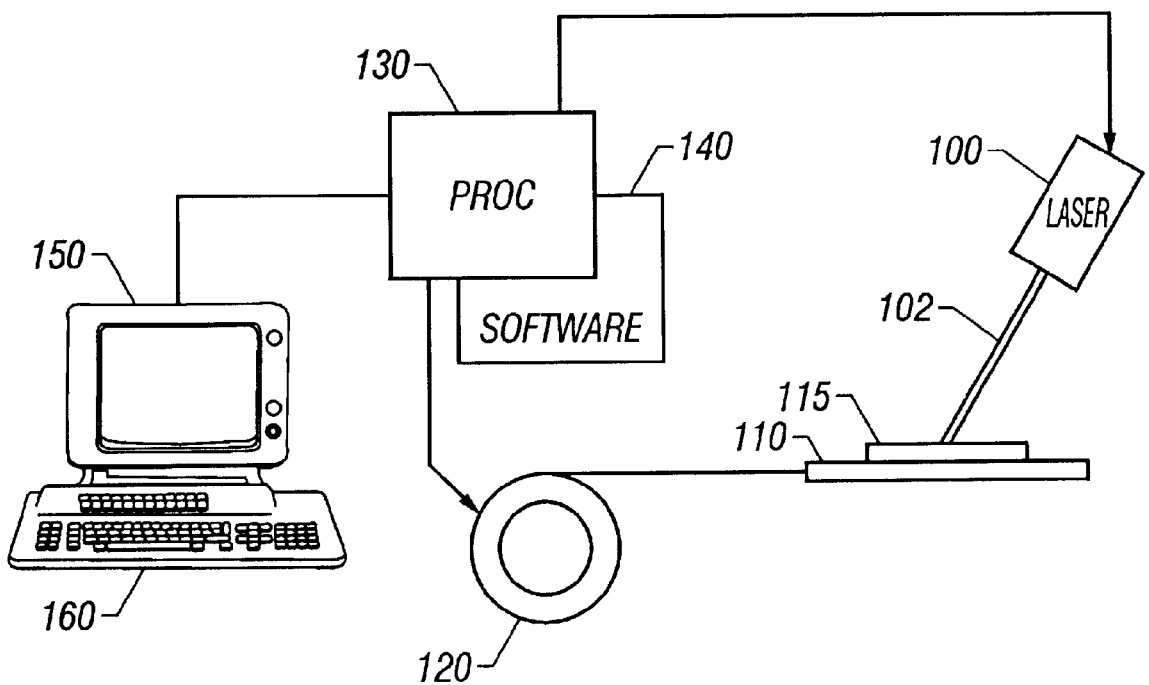
FIG. 1 shows a block diagram of the basic system of the present invention including the processor, and the marking device being a laser.

The basic system using the present application is shown in FIG. 1. A high-power laser 100 produces a laser output 102 which is directed at a working surface 110. A garment 115 is shown placed on the working surface at a location of the laser 102. The laser 100 is preferably a high-power laser, e.g. one which has a power output greater than 200 watts, and configured in a way which provides the capability of changing its energy density per unit time at any time, e.g., including during a specified scan line of the laser. A material delivery system, shown generically as 120 obtains textile materials to be processed, and places the materials in the location shown in the drawing, to be processed by the laser.

While the marking device is shown in this figure as being a laser, it should be understood that other marking device can be used as described herein.

The materials 115 may include bulk fabric or pre-made garments. The fabric forming these garments can be of any type, although special advantages may be obtained when the fabric is denim. The material delivery system and the laser are each controlled by a central processing computer shown as 130. The computer 130 can be multiple separate computers or can be a single computer. The computer 130 also runs a software program shown as 140 which produces output codes that control the laser operation. A user interface including a display 150 and control 160 enables the user to enter commands on the control 160 which are displayed on the display 150.

In operation, the control software 140 carries out a number of different operations described herein. First, the software 140 allows selecting various effects to be written on material 115. These effects can be any of the effects described in our previous patents, or alternatively can be the specified mathematical effects which are described herein. The software 140 also stores a database of effect codes.

The effect codes show the effect of the laser on the actual microstructure of the fabric. Effects of various laser powers on specified materials may be included within the effect codes. Each effect code may represent some aspect of the way that a specified writing will affect a specified material. The software can use the effect codes to simulate how the fabric will look when the pattern is applied by the laser to the fabric. One way in which this can be done is to simply define each effect as having a specified output look on the material. Then, the effects are viewed on the screen 150, based on each output look. In addition, the effect codes may represent different effects that will be caused based on the weave of the material, e.g., the direction of the denim weaves.

Therefore, another operation of the software allows the user to test the image that is created from these techniques, without actually using the laser system.

The user can interact with the effect selection by entering parameter values, modifying looks and producing a final pattern to be written on to the material.

The selection of effect uses a tool set which is described in further detail herein. The tool set includes:

1) a plurality of pattern generation tools. The pattern generation tools are based on modular level sets of mathematical functions.

2) a special set of a pattern generation tools that is based on fractal mathematics.

3) a set of blending and/or smoothing tools;

4) a set of graining and or annealing tools;

5) a set of pattern generation and manipulation tools based on concepts from cellular automata.

Figure 2A:
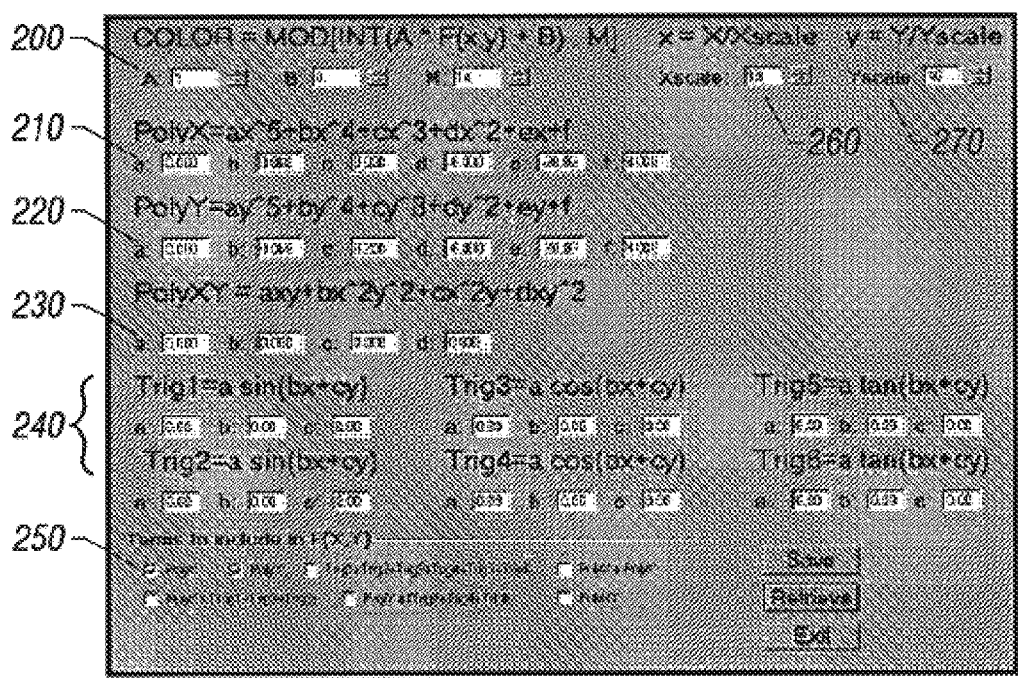
FIG. 2A shows a user interface for a modular level set.
Figure 3:
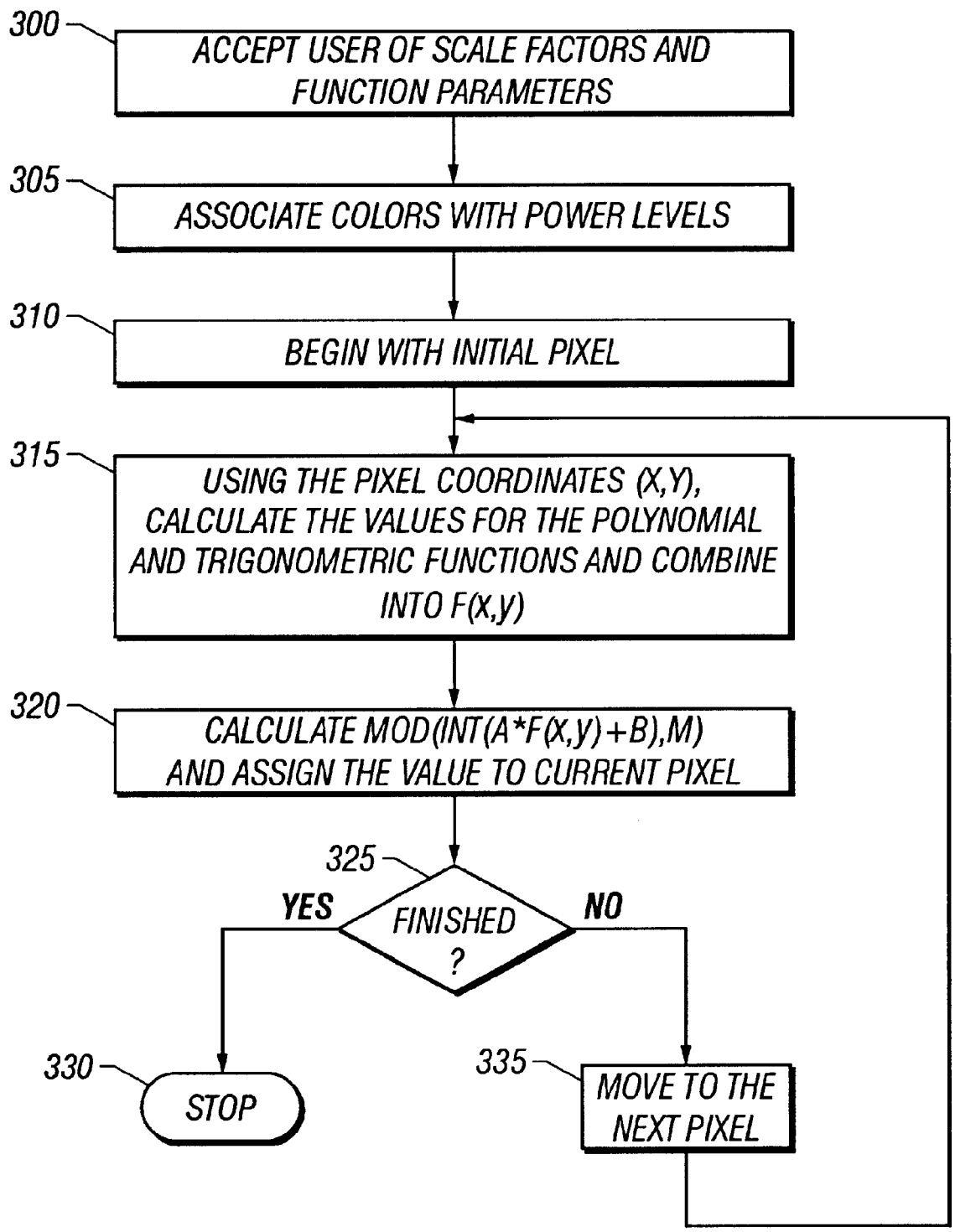
FIG. 3 shows a flowchart of operation for the modular level set function.

A first tool, based on modular level sets, is shown in the user interface of FIG. 2A and the flowchart of FIG. 3. FIG. 2A shows the different kinds of mathematical elements that can be used. Any or all of these mathematical elements can be used within a single image.

At 300, the user first sets scale factors and function parameters on the user interface of FIG. 3. The first, pattern generation tools shown as elements 200, may operate on a pattern that is formed on a pixel level. Each pixel is first assigned x,y coordinates (x,y). A "pixel" can be any size picture element. For example, a pixel can be larger than the corresponding pixel element unit that is displayed on a display screen. A pixel's size may be set to any size that produces the desired effect on the material being processed, and can be from um size, to inches.

A parameterized function F(x,y) may be selected. The parameterized function may be selected from known mathematical functions. Example mathematical functions may include polynomials, trigonometric functions, such as sine, cosine, tangent, inverse trigonometric functions such as arc sine, arc cosine, arc tangent, exponential functions, logarimithic functions, hyperbolic functions such as hyperbolic sine, inverse hyperbolic functions, Fourier transforms, Bessel functions, factorial, Root functions and others.

Different aspects of the software 140 are described herein. A first aspect relates to the specific pattern generation tools.

Figure 33:
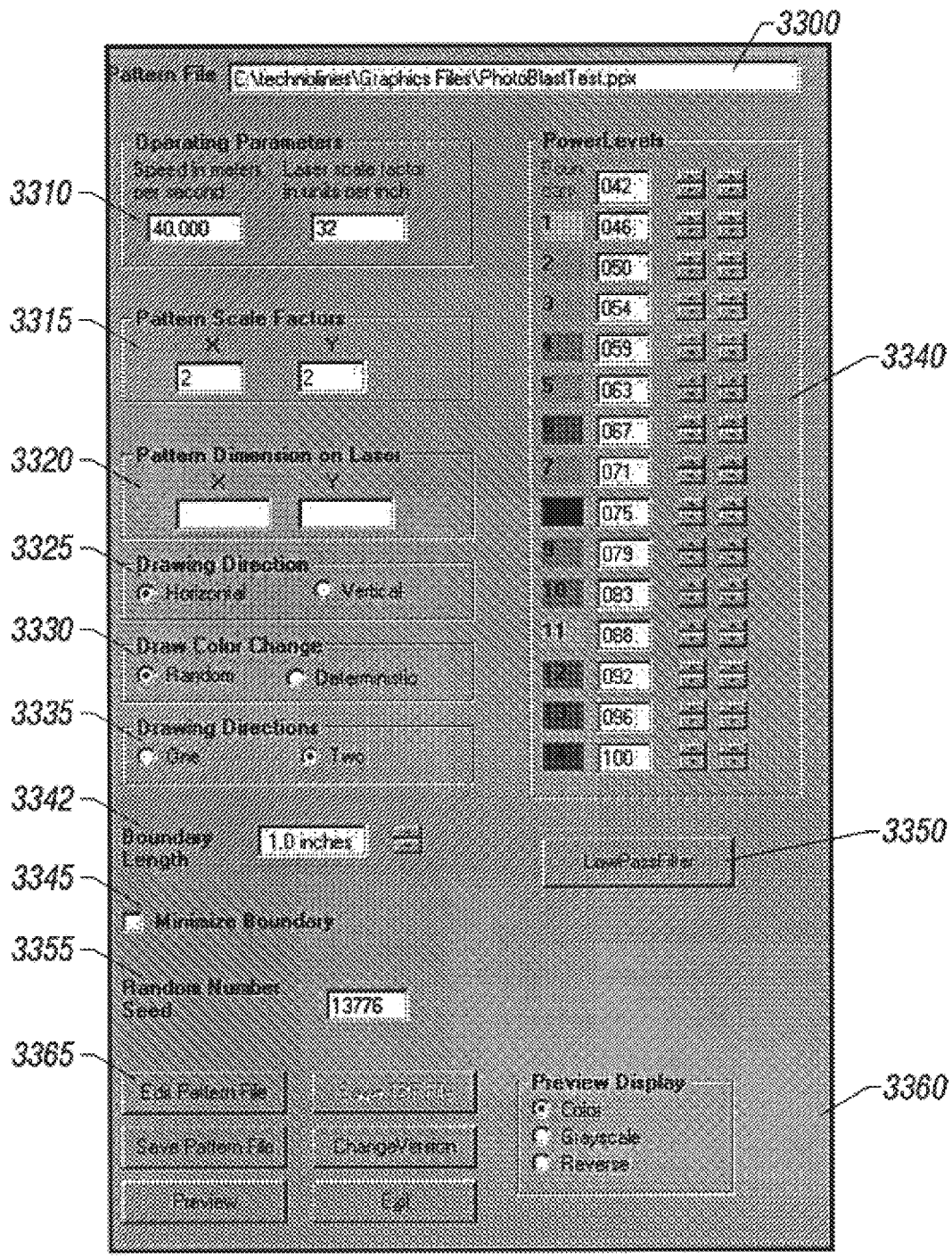
FIG. 33 shows a user interface for associating colors with power levels and setting values of a marking units such as a laser.

At 305, an initial definition is made that associates "colors" with specific power levels. Each "color" can be a conventional color, or a gray scale, or any other indicia that can be viewed on a screen or user interface. Each color is associated with a specified amount of output energy from the laser. The amount of output energy can be measured as energy density per unit time, amount of energy output, or any other level of energy output. FIG. 33 shows the basic user interface which can be used to associate the amount of output energy with the colors that are used.

Each of the colors in the pattern becomes a variable value. Each specific pixel at (x, y) is associated with a variable color. The set of pixels form the image. Again, the pixels do not need to be of any specified size, they can be arbitrarily small or arbitrarily large. The pixels of the image can be changed, either one by one, or a group at a time. According to the present system, the change is calculated according to a specified function.

Therefore, in the flowchart of FIG. 3, the system begins with an initial pixel at 310.

At 315, using the pixel coordinates x,y the values for the modular level sets are calculated. This is combined into F(x,y). At 320, the remaining parts of the function are calculated. If the operation is completed at 325, the system stops at 330. If not, then the system moves to the next pixel at 335.

Once the entire image is obtained, the values are converted into a form that can be used by the laser, and mapped to laser scan lines.

The preferred technique described herein forms the effect on the material using a laser to change the look of the material. However, this same technique can also be used to form a pattern which changes the look of the material using a different technique, such as by silk screening, printing, painting, or any other technique.

FIG. 2A shows a first user interface screen in which the mathematical function used to select the "colors" includes modular value sets, or more specifically, functions of the form $ax^n+bx^{n-1}+\ldots$ either by themselves, or in combination with other parts such as integer and modulus. The user interface allows entering values for the modular sets. A first field 200 determines the color at the pixel as color=MOD [INT(A*(F(x,y)+B), M], (320, in FIG. 3) where MOD is the modulus or "remainder" function, INT is the integer or "rounding" function, and A and B are user parameters.

Each of the user parameters A, B and M can be changed by the user.

The function F(x,y) can also be changed to any of the functions shown as 210, 220, 230 or others including the specific functions described herein.

The different functions define how the color for each image portion, e.g., each pixel, is calculated. Each color includes a polynomial function as in 210, where Poly $x=ax^5+bx^4+cx^3+dx^2+ex+f$.

Another specific function is shown in 220, where

Poly $y=ay^5+by^4+cy^3+dy^2+ey+f$.

The function can be made more complex in 230, using the function

Poly $x,y=axy+bx^2y^2+cx^2y+dxy^2$.

240 shows a set of trigonometric functions. These functions include, as described above, sines, cosines and tangents. The specific trigonometric functions are shown as:

Trig1=a sin(bx+cy)

Where each of a, b and c are separately controllable,

Trig3=a cos(bx+cy)

And

Trig5=a tan (bx+cy)

A bottom portion 250 allows the user to select which of the terms to include in the F(x,y). If any of the terms become inconsistent with one another, then the user interface may take some action to prevent these terms from being used, e.g., may shade certain items once others are selected.

The actual information in FIG. 2A has selected field 210; poly x, with a=1; b=0; M=14, with b=0.06, c=0.02, d=−6.0, e=−20 and f=8.

Poly y is also selected with b=0.06; c=0.2; d=−6, e=−20 and f=8. None of the other terms are included in F(X, Y), as shown in the selection area 250.

Figure 2B:
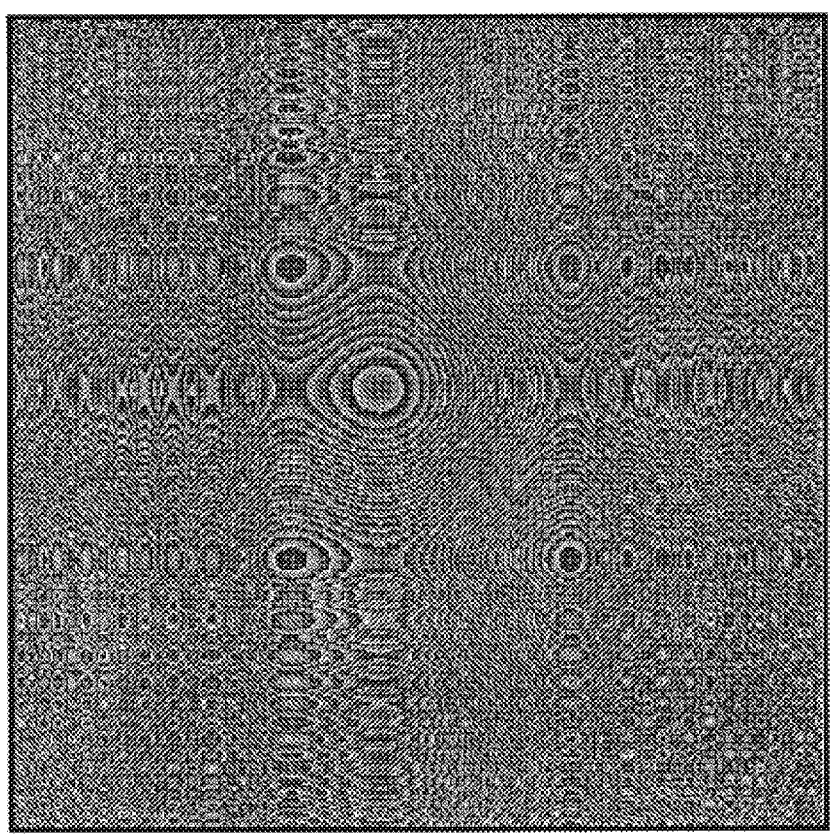
FIG. 2B shows an actual pattern obtained from that specific values in that modular level set.

The actual results of these specific parameters is shown in FIG. 2B. This produces a complicated pattern. The pattern can also be scaled using the X scale 260, and y scale 270 controls.

The pattern in FIG. 2B shows a complex series of concentric circles arranged in whorls like a fingerprint. Other patterns are also obtained.

Figure 4A:
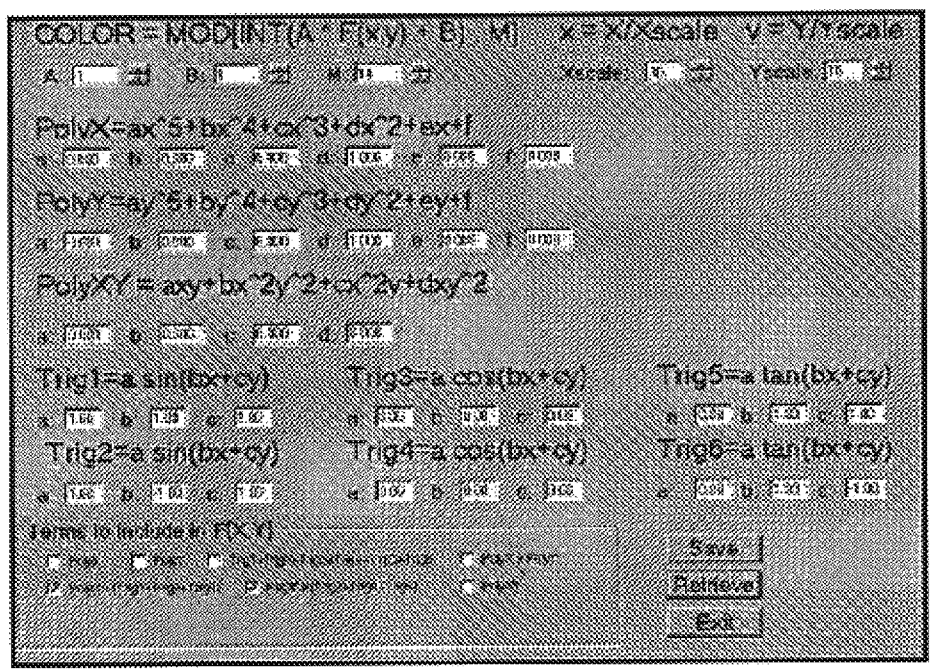
FIGS. 4A and 4B; 5/6; 7/8; 9/10; 11/12 show additional sets of specified values and effects obtained from those specified values.
Figure 4B:
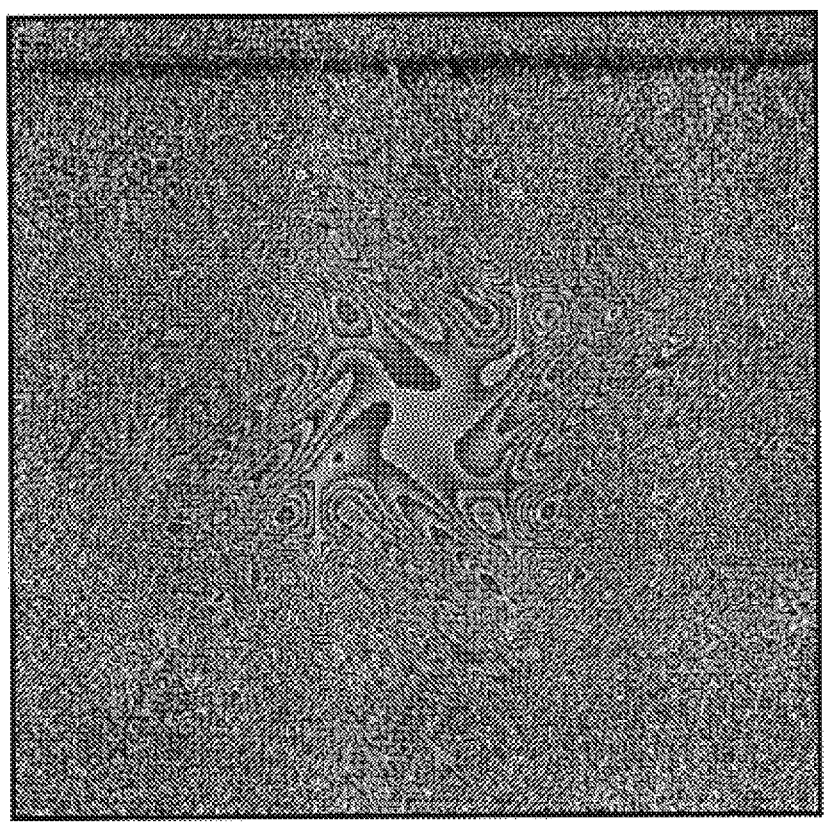
Figures 5, 6:
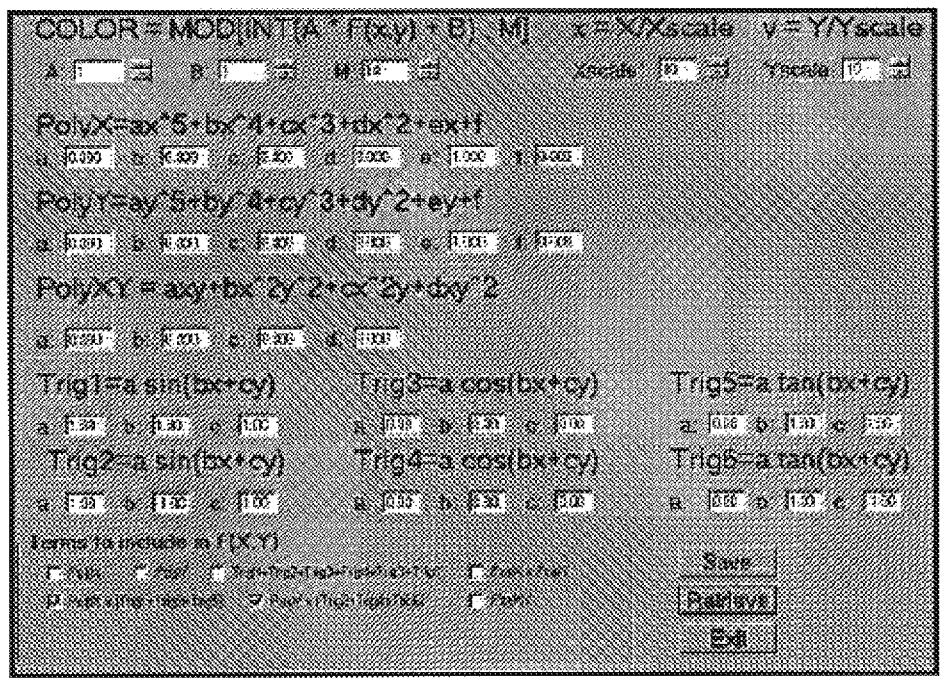
Figure 7:
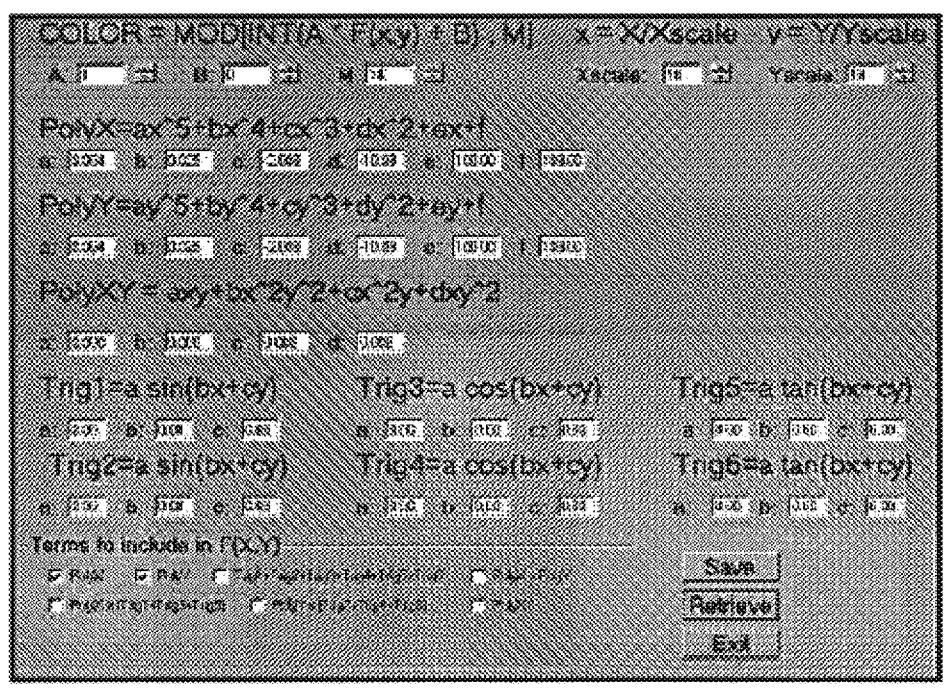
Figure 8:
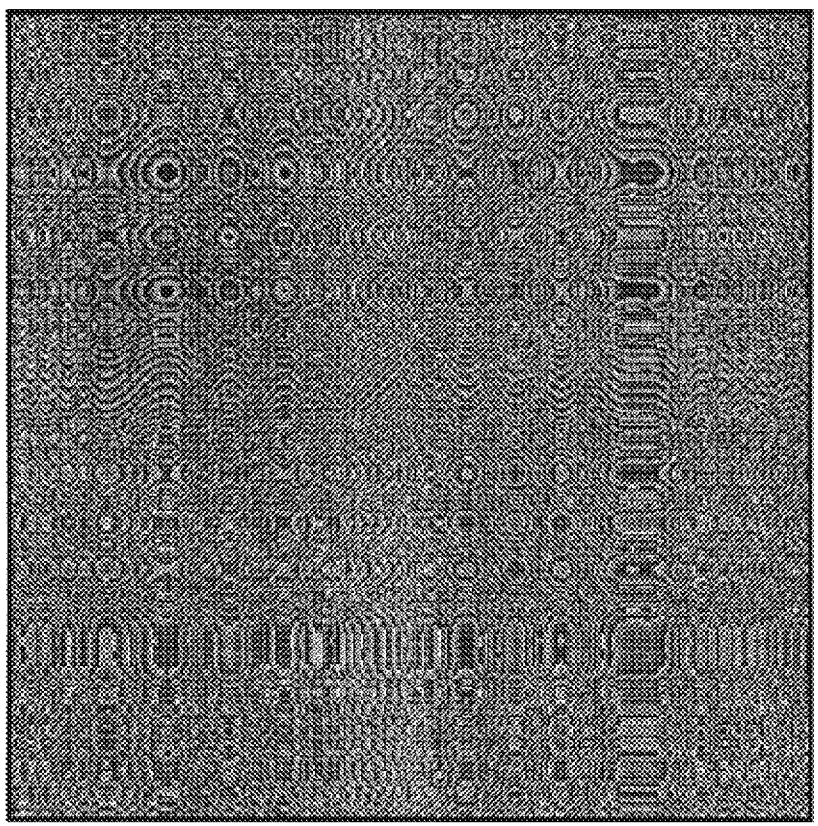
Figure 9:
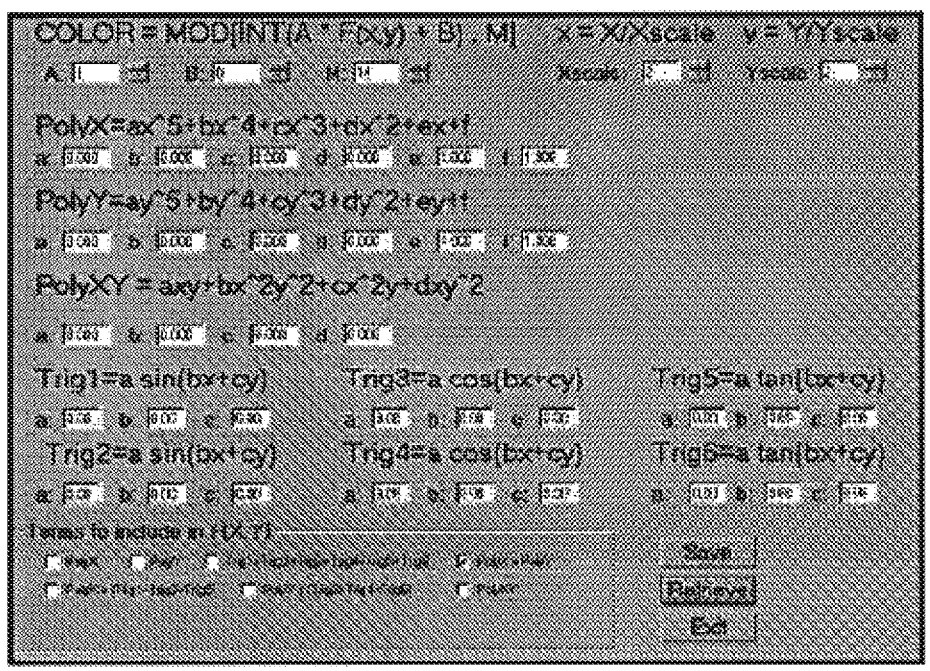
Figure 10:
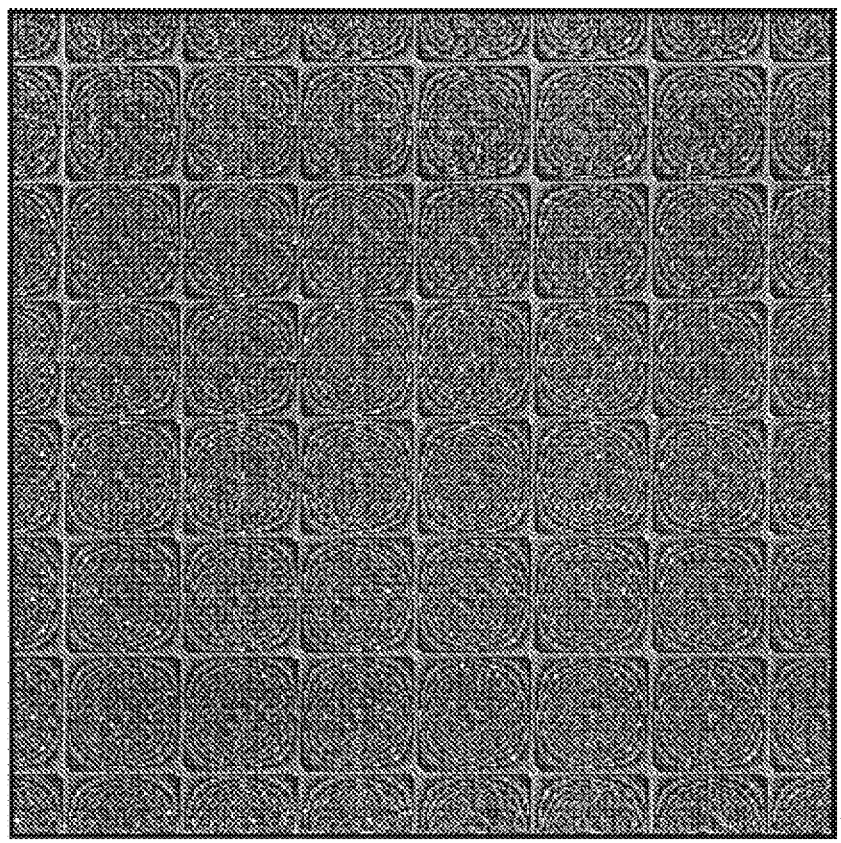
Figure 11:
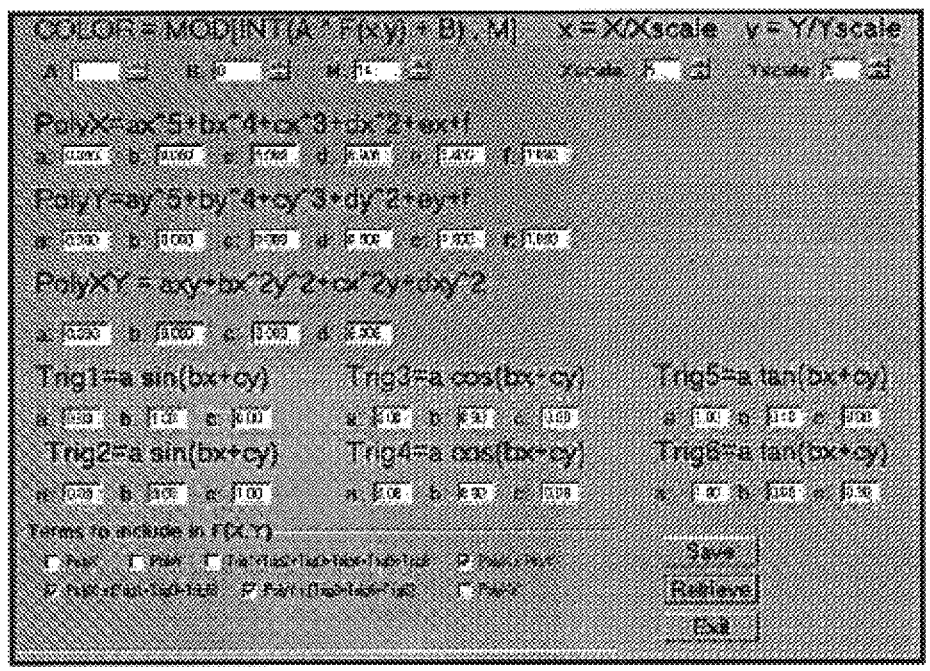
Figure 12:
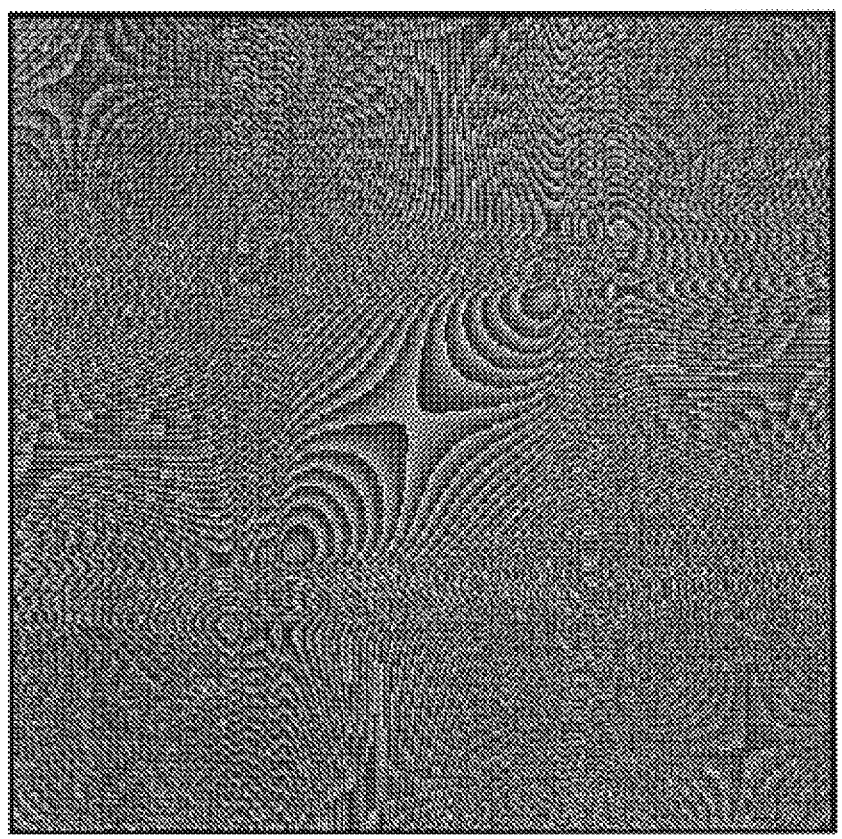

The parameters shown in FIG. 4A result in the pattern shown in FIG. 4B. In this parameter set, the values form a central enlarged portion, with the other portions having other characteristics. The parameters shown in FIG. 5 results in the pattern shown in FIG. 6 in which a plurality of wormlike structures are formed, each with central round portions. FIGS. 7 and 8 show additional features. FIGS. 9 and 10 show any repeating feature set in which each feature is a substantial unit which includes concentric portions therein. The concentric portions are virtually divided into different quadrants. FIGS. 11 and 12 show yet another effect.

By changing the user parameters, an unlimited variety of parameters can be formed and eventually scribed on the fabrics.

Figure 30:
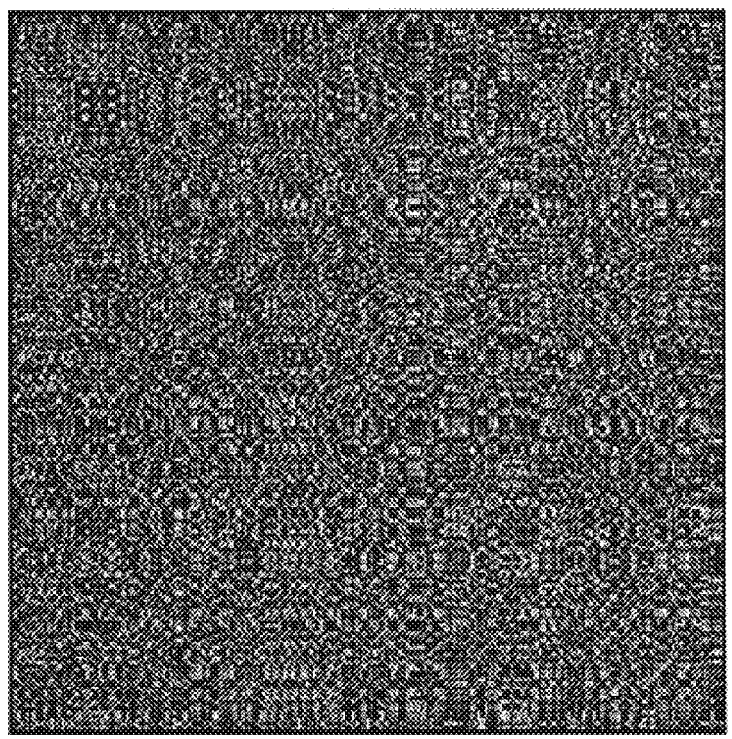
Figure 31:
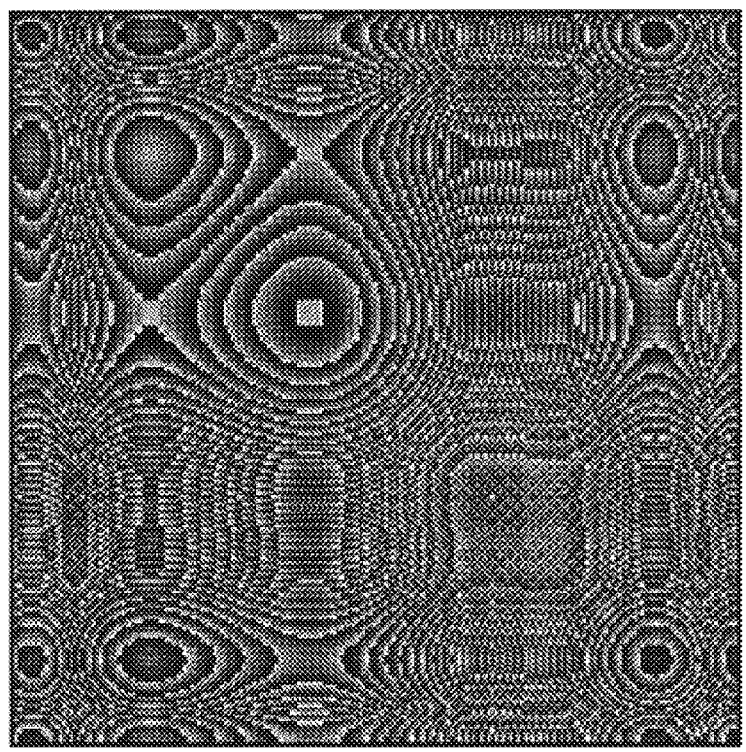
Figure 32:
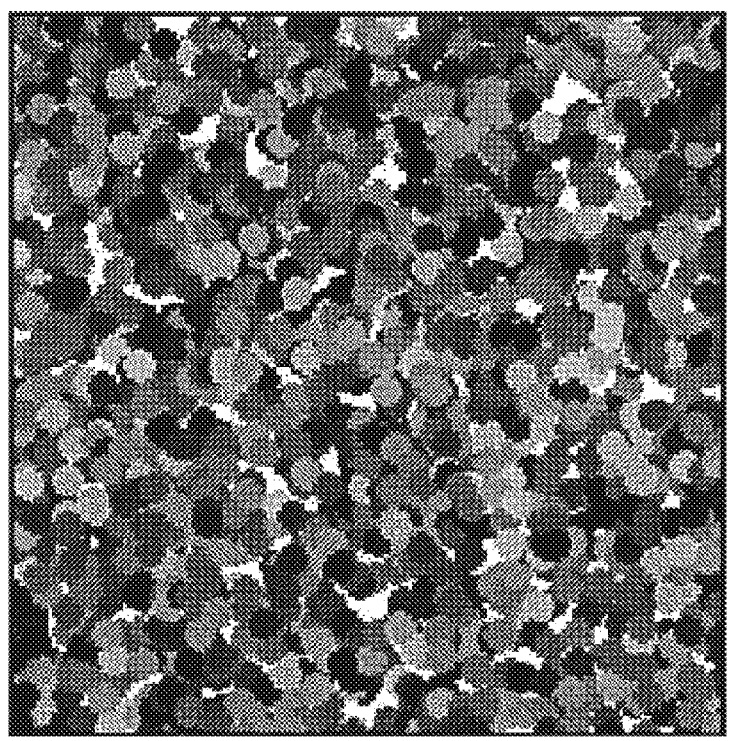

Different geometric looking effects can be created using this tool. Each of the effects basically includes a plurality of different geometrical objects arranged in different ways. FIGS. 30 and 31 show two additional images that have been created using this tool.

Another set of values can be created using mathematical functions based on fractal mathematics. Fractal mathematics are well known. For example, fractal mathematics are described in the Scientific American article by A. K. Dewdney "Computer Recreation: a Computer Microscope . . . Mathematics, "Scientific American (August 1985) pages 16 through 25.

Many different techniques and algorithms are known for generating images based on fractal mathematics. Two well-known techniques include Mandelbrot and Julia sets. Different fractal patterns are also known. A number of different fractal mathematics are described herein. Any of these techniques could be used, in addition to many other fractal techniques that are not specifically described herein.

A Mandelbrot fractal is a rough or fragmented geometric shape that can be subdivided in parts, each of which is (at least approximately) a reduced-size copy of the whole. A general equation for the Mandelbrot fractal is of the general form $z_{n+1}=f(z_n)$, used to create a series of a complex variable. One example function is $f(z_n)=z_n^2+z_o$. This series in generated for every initial point $z_o$ along some partition. Each point on the image can decay to 0, increase toward infinity, oscillate among a number of states, or change completely randomly. Each of the areas of the image can separately change, for example, in each area, the points can change according to a different function.

Another function, called a "biomorph" uses the function $f(z_n)=\sin(z_n)+z_n^2+c$. This kind of fractal may produce different functions based on the value of the constant "c".

Strange attractor fractals may shows values from a chaotic system. The series is formed as an equation of a complex variable or as two interrelated equations, one for the x and one for the y coordinate. An example function is $$X_{n+1}=y_n-\sin(x_n) |bx_n-c|^{1/2}$$
$$Y_{n+1}=a-x_n$$

For strange attractors, the initial point does not matter, i.e.: all initial coordinates xo,yo result in the same image.

Another set is $$x_n+1=\sin(ay_n)-\cos(bx_n)$$
$$y_n+1=\sin(cx_n)-\cos(dy_n)$$

This gives swirling tendrils that appear three-dimensional.

The Newton Raphson technique is based on the Newton Raphson method of finding the solution (roots) to a polynomial equation of the form $$f(z)=\alpha_0+a_1Z+a_2z^2+K+a_mz^m=0$$

$$Z_n+1 = Z_n - \frac{f(z_n)}{f'(z_n)}$$

where f'(zn) is the slope (first derivative) of f(z) evaluated at zn. To create a 2D image using this technique each point in a partition of the plane is used as initial guess, zo, to the solution. The point is colored depending on which solution is found and/or how long it took to arrive at the solution. Diffusion Limited Aggregation fractals can also be used in such a system. These fractals describe the diffusion and aggregation of zinc ions in an electrolytic solution onto electrodes, for example.

Fractal Geometry forms can also be used. These forms are based on geometric forms formed of lines, planes, rectangular volumes, arcs, cylinders, spheres, etc.

The system can also use fractal Landscapes based on line systems or "L-Systems", or based on polygons, also called "iterated function systems". This system carries out a set of contractive transformations on a plane of the form $$\begin{pmatrix} x_n \\ y_n \end{pmatrix} = \begin{pmatrix} a & b \\ c & d \end{pmatrix}\begin{pmatrix} x_{n-1} \\ y_{n-1} \end{pmatrix} + \begin{pmatrix} e \\ f \end{pmatrix}$$

Another technique uses chaos iterations of the form $$x_n+1 \leftarrow f(x_n, y_n)$$
$$y_n+1 \leftarrow f(x_n, y_n)$$

According to a second tool set, different sets of fractal mathematics are used to create images. Different portions of these images can be selected. The images can then be magnified, or demagnified. Any different parts of the images can be selected. Also, any different parameters can be used within the image.

Figure 13:
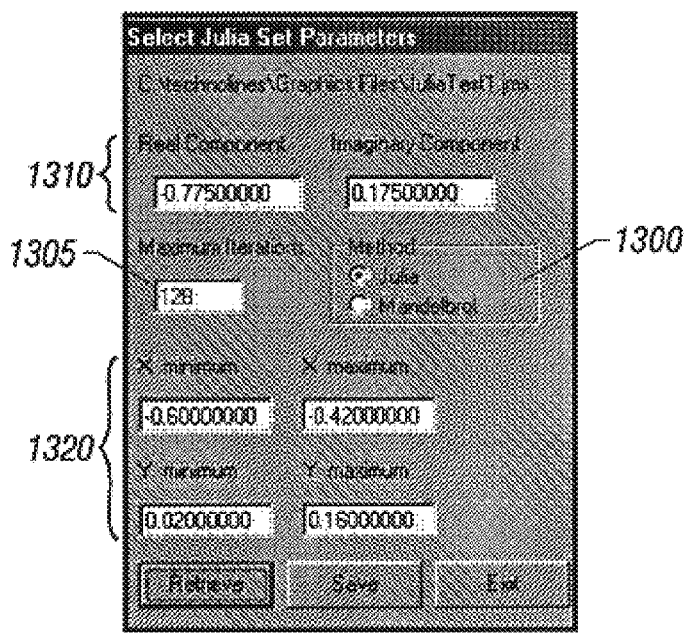
FIG. 13 shows a user interface for selection of fractal parameters.
Figure 14:
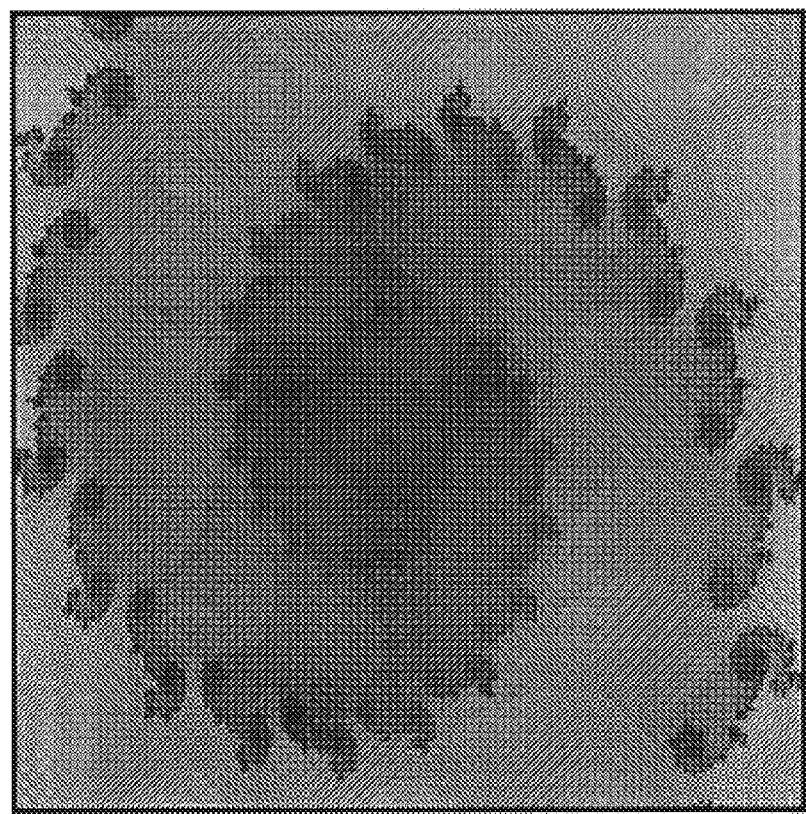
FIG. 14 shows a fractal design obtained from those actual parameters.
Figure 15:
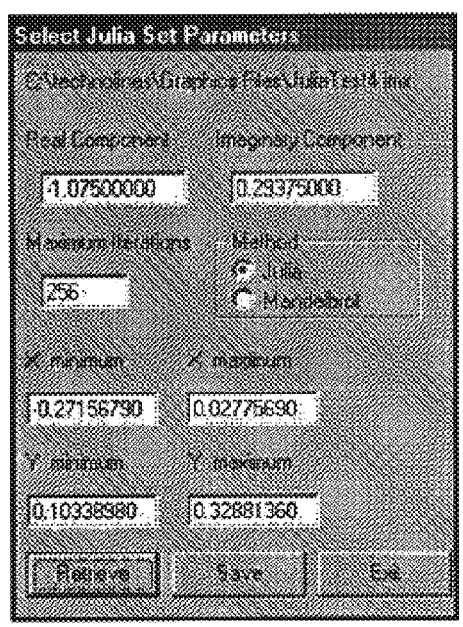
FIGS. 15/16; 17/18 show additional fractal parameters.
Figure 16:
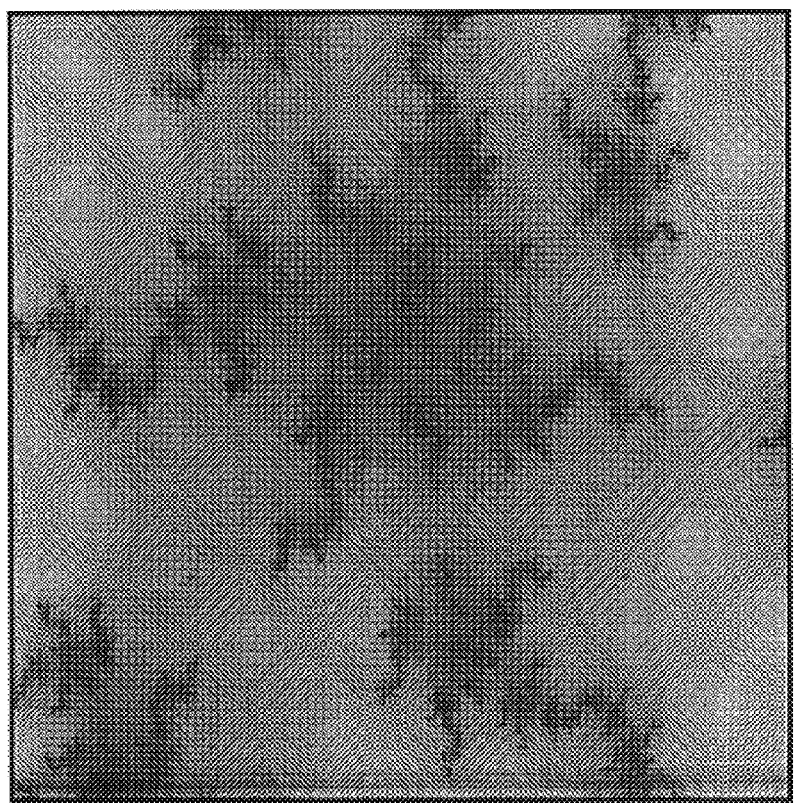
Figure 17:
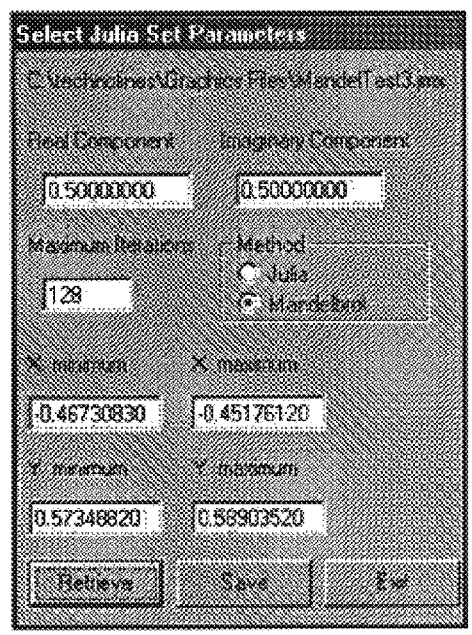
Figure 18:
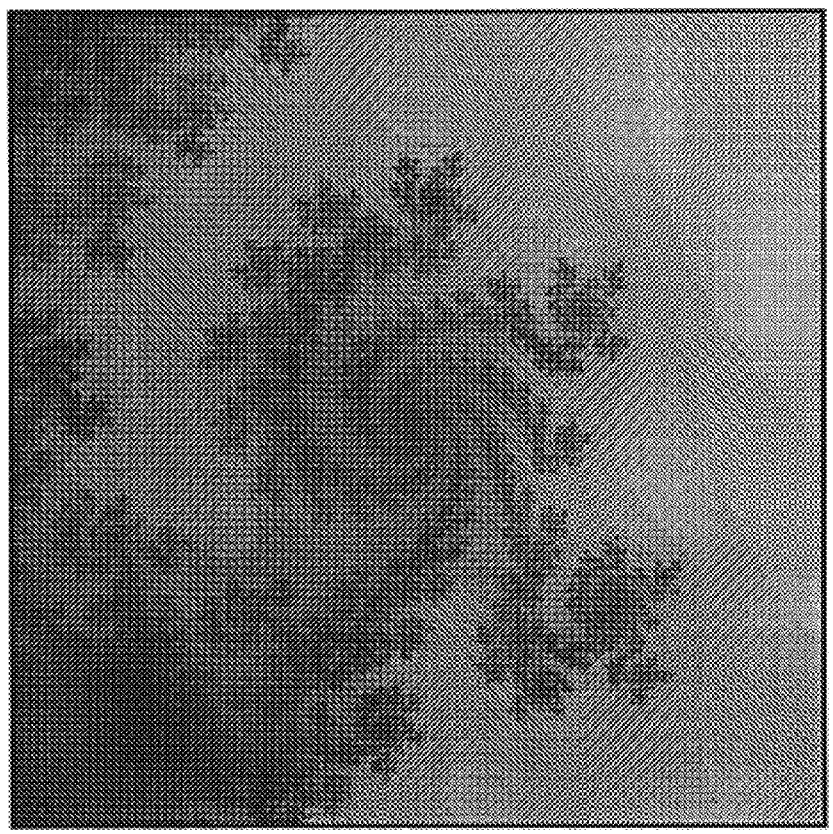

A user interface for the fractal mathematics is shown in FIGS. 13. This allows selection of one of the different kinds of fractal mathematics, including those described above, and any others, using the selection tool 1300. While this Figure only shows using Julia and Mandlebrot techniques, any other fractal mathematics technique can be used. The number of iterations is selected at 1305, and the real and imaginary components of the mathematics are selected at 1310. At 1320, the user selects x and y minimum and maximum values. Using the values shown in FIG. 13, the result shown in FIG. 14 is obtained. Figure pairs 15/16 and 17/18 show alternative parameter settings, and the results that can be obtained from those specific parameter settings.

Figure 19A:
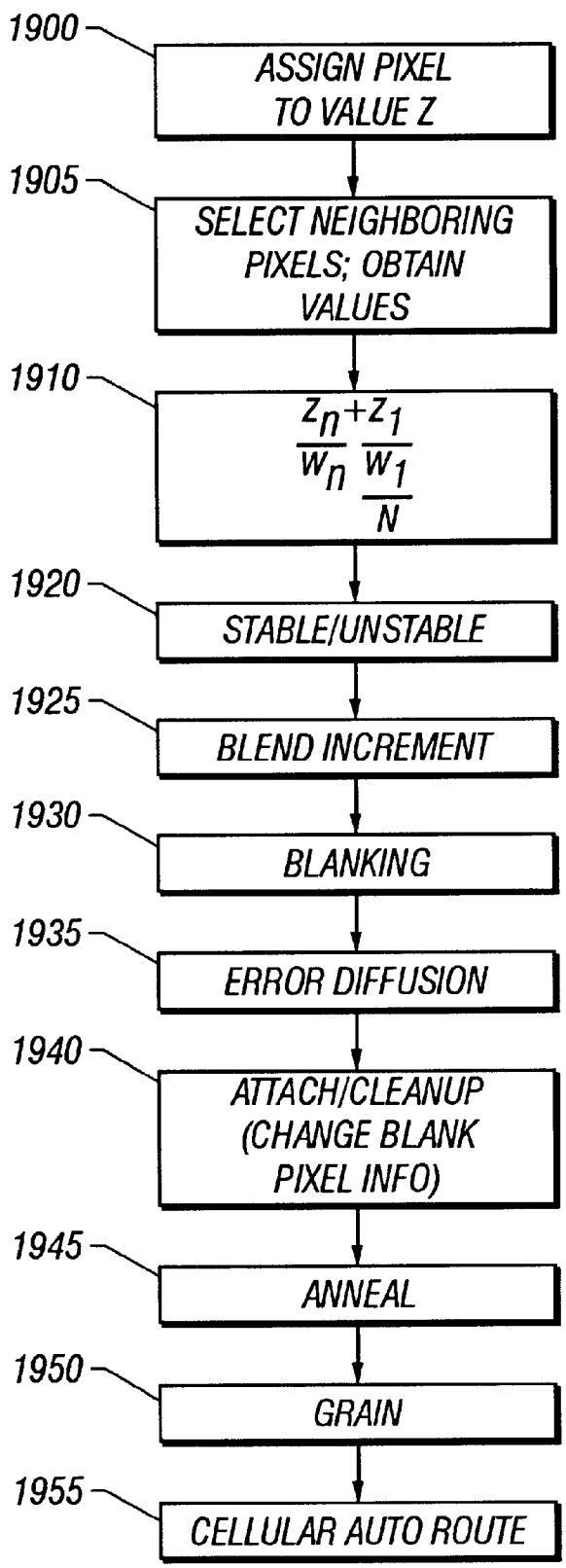
FIG. 19 shows a flowchart of tool operations for the images.
FIGS. 19B, 20–32 shows specific patterns which are obtained from these values.

Another mathematical tool uses blending and/or smoothing tools to modify the images that have been created. A blending tool carries out a modification on patterns that are created by any manual or automated method. The patterns are blended on a pixel-by-pixel basis. The blending can be carried out using any desired technique. One such technique is described below with reference to the flowchart of FIG. 19.

Assuming that the pattern is based on k "colors", each pixel is assigned a value Z which is between 0 and k at 1900. The process of blending replaces each pixel's value with a weighted average of values of pixels in a neighborhood of a specified size. For a 3×3 neighborhood, the blending can replace each given pixel with a combination of that pixel as affected by values of its eight adjacent pixels. In 1905, all of the neighboring pixels within the selected neighboring size are selected. Its values are obtained at 1910, and the values are combined and weighted by values $W_n$. The weightings of the different pixels can be equal, can be unequal based on a specified direction and/or distance or a linear or non-linear relationship, or can be totally random. 1910 shows a mathematical operation of $$\frac{\frac{Z1}{W1} + \frac{z2}{w2} + \frac{z3}{w3} \ldots + \frac{zn}{wn}}{N}$$

can take any of the values $z_n$ and weight them by any desired amount $w_n$, and take an average of those values.

Two different kinds of blending can be used at 1920: labeled herein as stable blending or unstable blending. A stable blend determines all updated pixel colors based on the pixel colors at the beginning of the blend process. An unstable blend performs updating based on pixel colors as they have been updated so far in the process.

A blend increment option at 1925 allows the color intensity assigned to a pixel to be greater than or less than that computed by the averaging process. The blend increment may be defined in terms of percentages, i.e., how much greater than or less than the averaging process.

A blanking parameter, shown at 1930, specifies the number of neighboring pixels, or image areas that can be formed of multiple pixels, that must be non-blank before a blank pixel is allowed to become non-blank. This can provide useful control of the blending process, especially when abrupt lines exist in the pattern. Suppose, for example, a region includes a circle. If the blending were carried out without the blanking control, blank pixels that bordered the circle would be blended into the non-blank portion. This would unintentionally enlarge the circle. By setting this blanking parameter, blank pixels can be specially treated. This can keep the sharp edges and overall shape of geometrical objects.

Another part of the blanking option at 1930 allows selecting only pixels which are non blank to be changed.

Other size neighborhoods can be used. For example, further blending can be carried out by using a five by five neighborhood for example.

Weightings can be set in different ways. For example, the weight can be equal across the entire neighborhood. The weight can be unequal and weighted towards the center. Weights can also be set at random. In general, the weights can be set to any value, by assigning weights to pixels with each pixel Pn having a weight Wn.

Additional effects can be obtained using error diffusion. This process may be used as a dithering technique to improve the manipulation of the computer graphics. For example, this may approximate gray scale by black and white, or may be used for reducing color complexity. Error diffusion, for example, can be used for reducing 32-bit color to 8-bit color. Error diffusion may be used at 1935 as an option of the blend tool.

A specific example of error diffusion carries out a blending calculation for a specified pixel. Suppose this produces a value of 7.25. That value is then rounded to 7, and assigned to the given pixel. There is, however, an error in the rounding, here 0.25. This value is carried over as in increment to the blending calculation for the next pixel.

Figure 29:
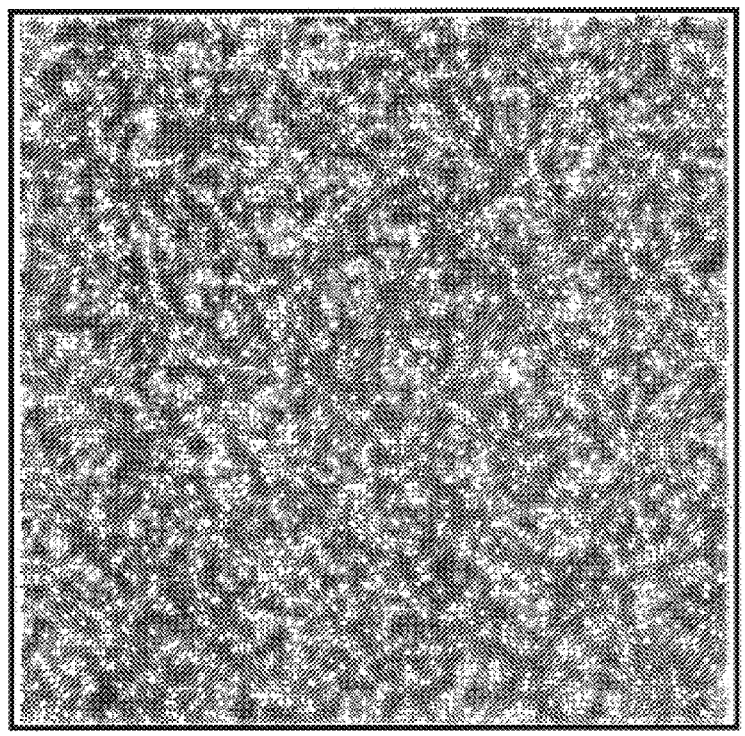

FIG. 29 shows a graphic image that has been created by a process beginning with a random distribution of randomly color pixels and completed with several applications of the blend tool.

Smoothing tools may include an "attach" tool and a "cleanup" tool shown as 1940.

The attach tool examines currently blank pixels, as well as the eight neighboring pixels. The attach tool assigns a pixel under consideration to a user selected color, but only if a sufficient number of neighboring pixels are non-blank. That number may be a user set parameter.

The cleanup tool is used to reduce stray marks. Non-blank pixels are examined, and made blank, unless a specified sufficient number of neighboring pixels are non-blank. This number may be a user set parameter. This effect can reduce stray non-blank pixels that are isolated from other non-blank pixels. Therefore, the cleanup tool may make the image look less noisy.

A completely isolated non-blank pixel might be a pixel that is non-blank, in a neighborhood with one or more blank pixels. A slightly isolated non-blank pixel may have seven blank neighbors and one non-blank neighbor.

Many of the effect described herein are produced by experimentation using mathematical tools. As byproducts of the tools, especially byproducts of the fractal tool, stray portions may be left. The cleanup tool is therefore used to cleanup the results of the mathematical process.

The grain and annealing tools operate to blend pixels using a different paradigm than the blending tool.

The annealing tool shown at 1945 is an iterative procedure that changes a color based on the number of iterations where the color has stayed the same. A number of passes through a specified process is carried out. Each pass causes the color to be changed in some way. The way in which the color is changed can be based on any function or any other technique described herein.

Each pixel may also have a weight associated with the pixel. The weight is reset each time the color is changed during each iteration, the value of each weight is increased unless it is reset during that increment. Therefore, the weights increase based on the number of annealing operations for which the color has remained the same. Colors that have been constant for more annealing operations are given higher weight. Any pixel color that has remained constant for a user specified number of annealing operations may be considered fixed with respect to the annealing tool. At any point in a sequence of annealing operations, the color history can be reset to zero by the user.

The grain tool at 1950 adds to the techniques carried out by the annealing tool. However, the grain tool requires that a new color which is to be added to the image must be among those that already appear in the neighborhood. In this embodiment, after the weighted average color is computed, the new color may become that color in the neighborhood which is closest to the average value.

Figure 19B:
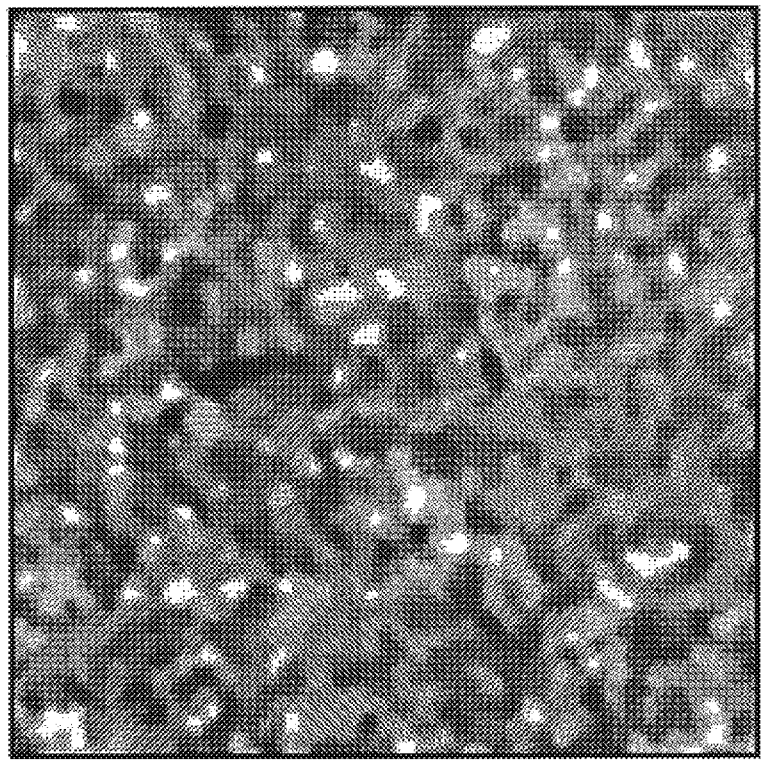

FIG. 19B shows an example. A graphic image is created by a process beginning with the random distribution of randomly-color pixels. The image is completed using several applications of the grain tool and several applications of the annealing tool. Note that the grain tool tends to make the colors segregate into batches of the specific colors.

Another set of tools is based on cellular automata. Cellular automata is a branch of mathematics which allows modifying states of different parameters. These can be thought of as finite states machines which change the states of their cells, here the cells being pixels, step-by-step according to a set of rules.

A Boolean cellular automata is a collection of cells that can be in one of two states, on and off, 1 or 0. The states of each cell varies in time depending on the connections, called rules, between the cells. While there can be any arbitrary set of connections/rules governing the system, a number of examples are described herein.

A first example is a linear strip of cells where the output of each cell at each time is a function of a current state of the cell and a state of its neighbors. The cell can be open ended, or can have its ends connected together to form a continuous band.

If there are two neighbors then, a value of any particular cell has its value determined by three values; its state and the state of its neighbors. This leads to at most 8 different transitions. For example, the rules might be as follows:

$$000 \to 0, 001 \to 0, 010 \to 1, 011 \to 1,$$

$$100 \to 1, 101 \to 0, 110 \to 0, 111 \to 0$$

Another example of cellular automata is based on the well-known Pascals triangle.

A number of tools can be defined based on the cellular automata. Here, the percolate tool and life tool are defined by specifying rules by which the cells change their states.

The cellular automata tools can be used to modify any existing pattern, or to generate original patterns. These tools have been given names appropriate to the way in which they operate. For example, two tools are described herein that have the names "percolate" and "life".

The percolate tool examines each pixel, and gives it the highest possible color intensity based on the color of pixels in the specified neighborhood. Each color within the range of colors is assigned a color threshold value which is based on a parameter that is set by the user. Each pixel in the neighborhood is also assigned a weight; also based on parameters set by the user.

Beginning with the highest color level, and working downward towards another color level, the following test is performed.

For a given trial color level, called color level K, the weights of pixels in the neighborhood for which the actual pixel color is greater than or equal to K are summed. The sum of the weights is compared with a threshold value for color K. If the sum is greater than or equal to the threshold value, then the pixel under consideration is assigned to color level K. Otherwise, the trial color level K. is decreased by one and the test is repeated.

The percolate tool may also produce unique texturing effects when applied to an existing pattern. It can be used to produce a wide variety of lattice designs when sequentially applied to a series of patterns which begin with a pattern consisting of one or more isolated non-blank pixels. A large number of user set parameters can be defined, including the trial color level, weights, type of comparison for example greater than or equal to, and the like. The number of effects which can be set by the system therefore becomes extremely large.

Another cellular automata tool is called the life tool. This tool is operated in a matter which is analogous. Decreases in color level are provided in addition to increases that occur with the percolate tool. Again, a large number of effects become possible.

Figure 20:
Figure 21:
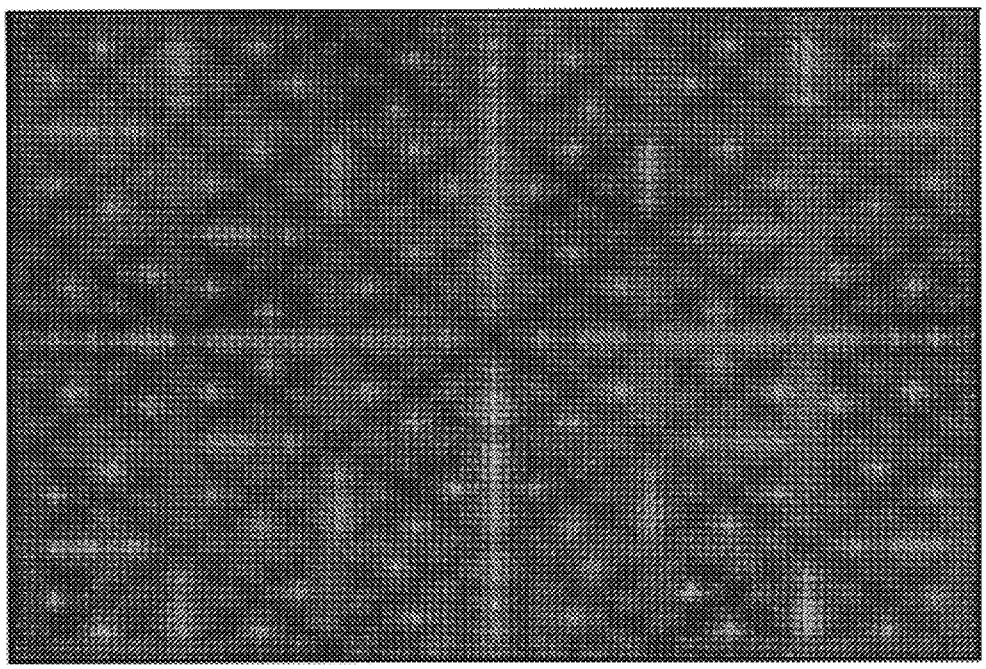
Figure 22:
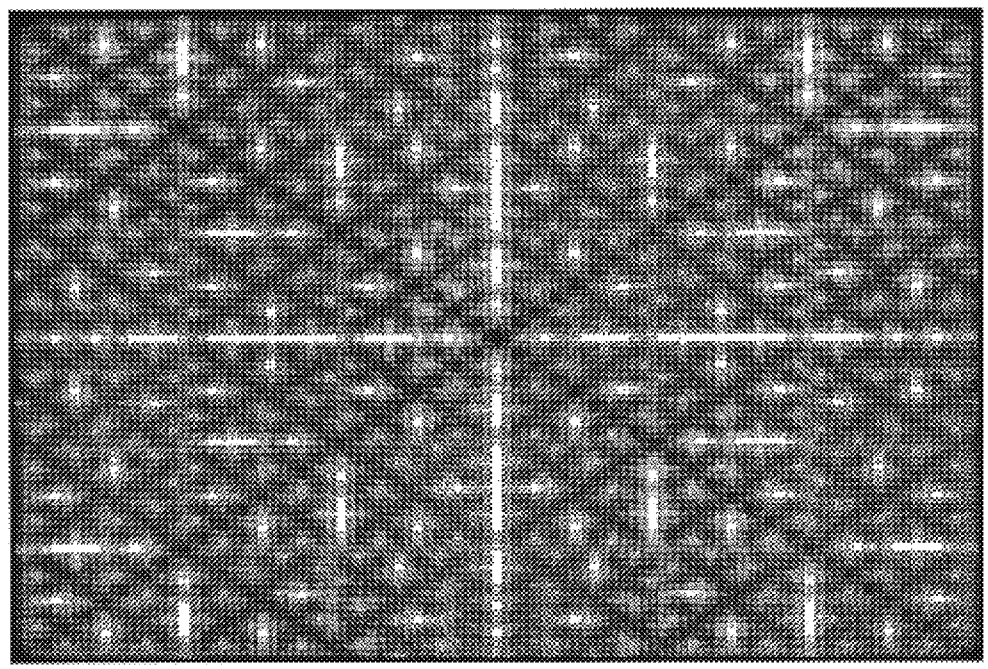
Figure 23:
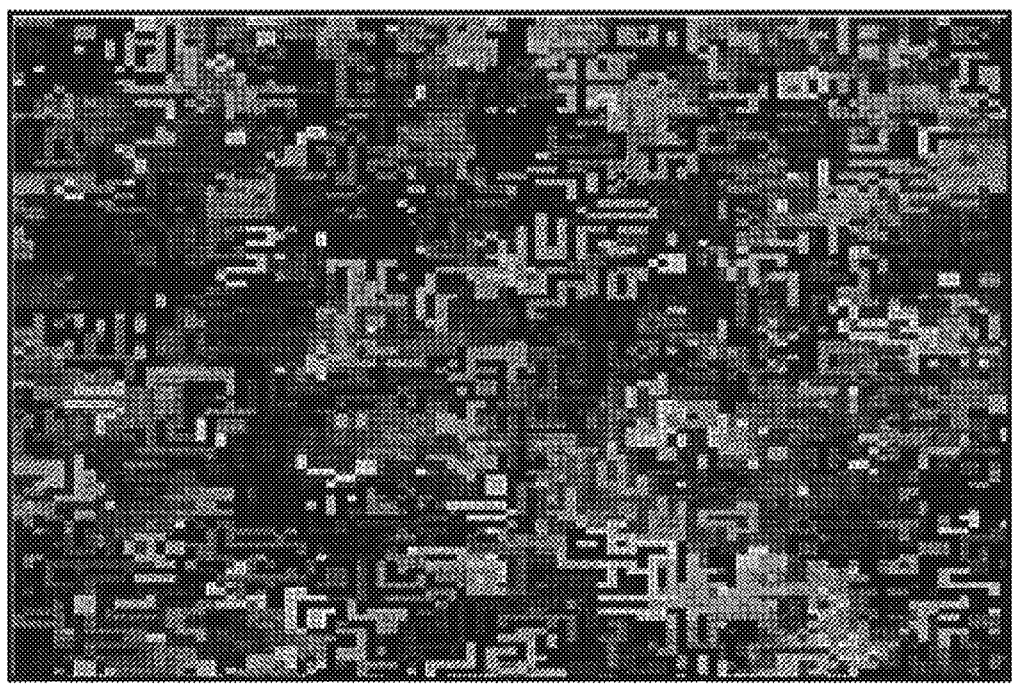
Figure 24:
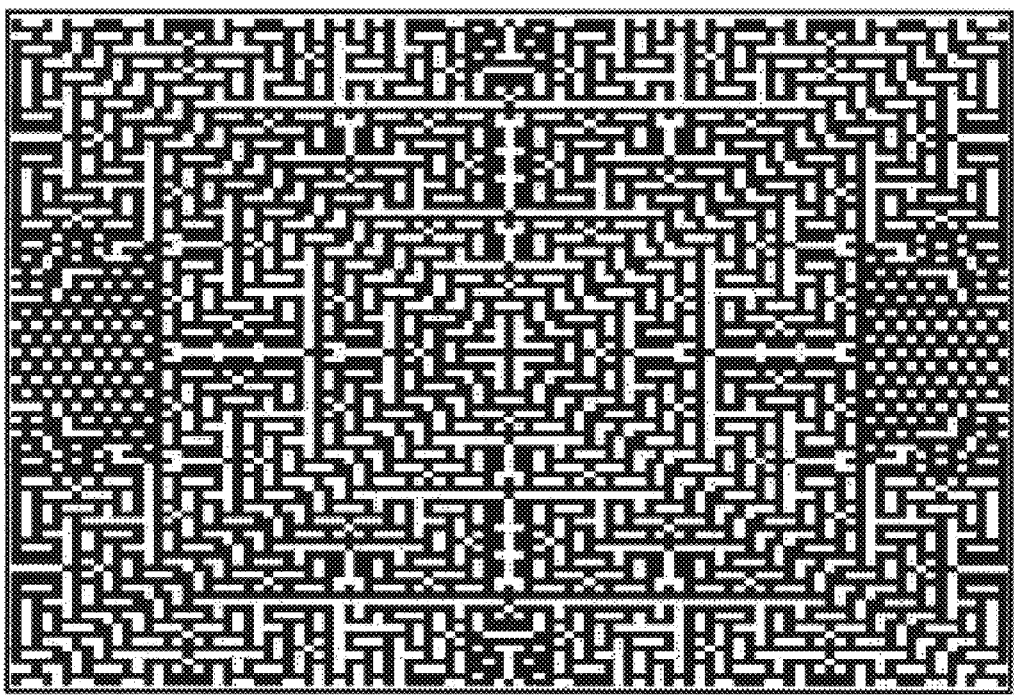
Figure 25:
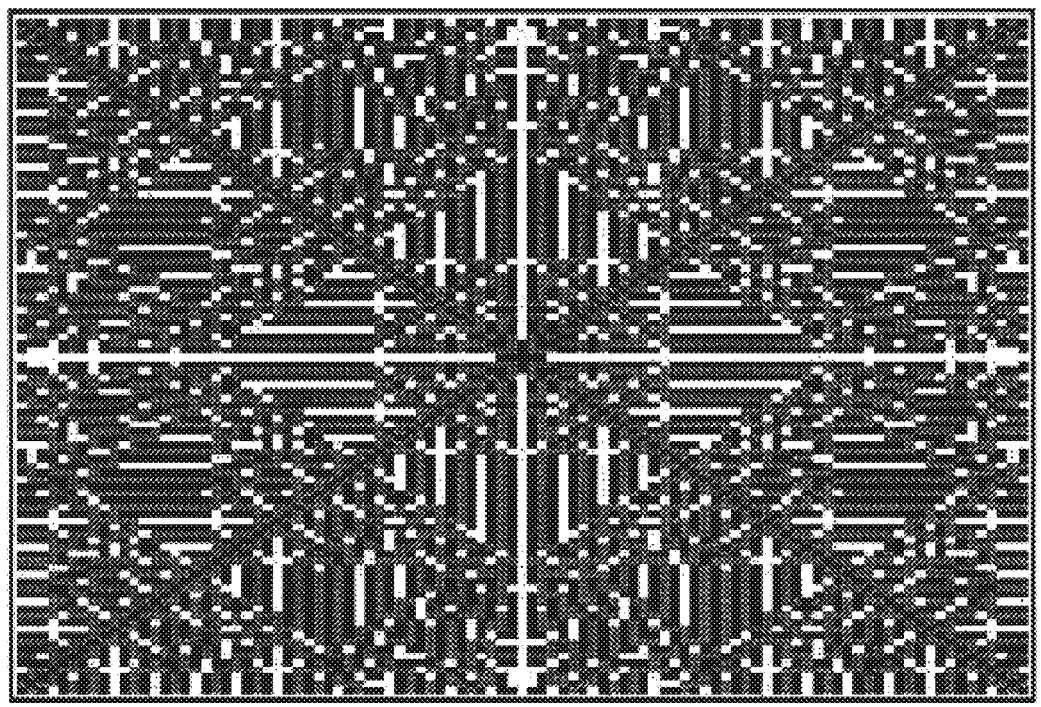
Figure 26:
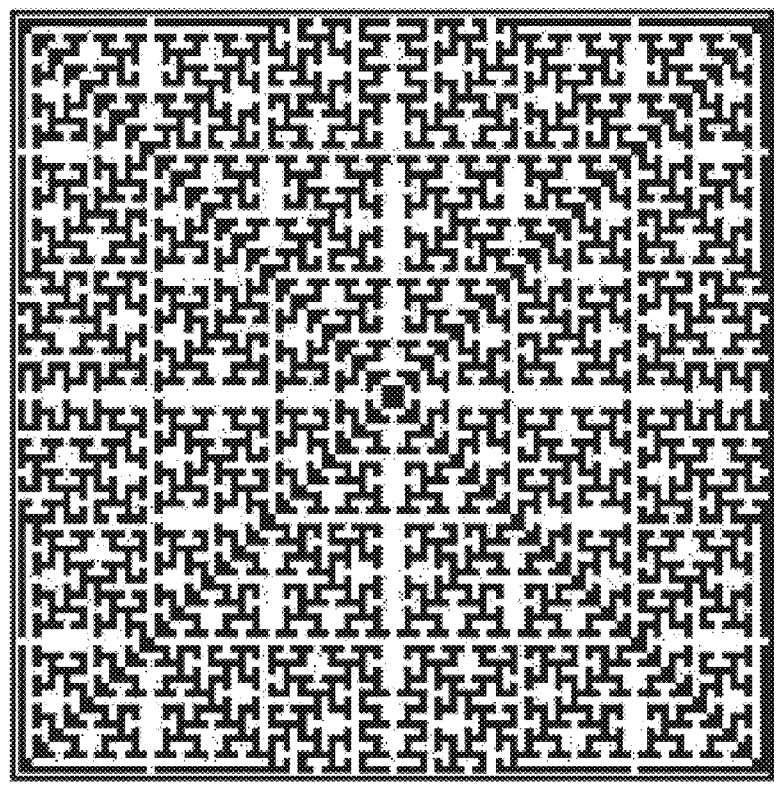
Figure 27:
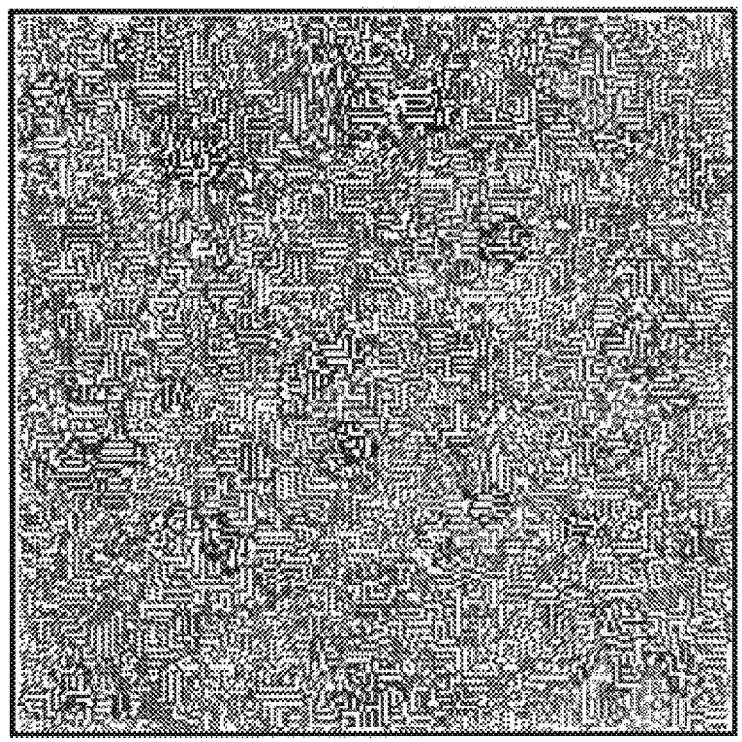
Figure 28:
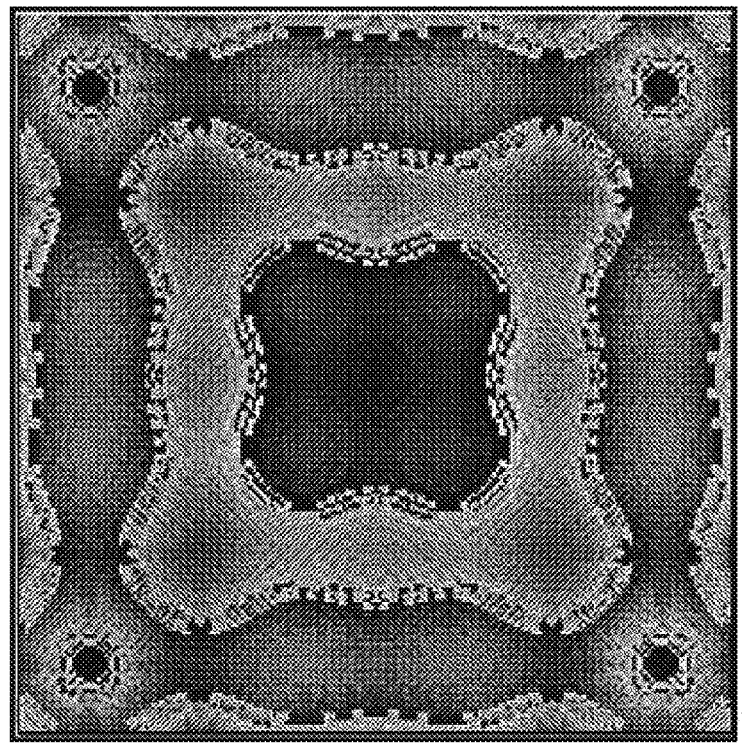

FIG. 20 shows a graphic image created by a process beginning with a random distribution of circles of random colors followed by several applications of the percolate tool. FIGS. 21–26 show graphic images created by a process that begins with one or more isolated pixels and several applications of the percolate tool. FIG. 27 shows a graphic image created by a process that begins with one or more isolated pixels and several applications of the life tool followed by several applications of the percolate tool. FIG. 28 shows a graphic image created by a process that begins with a graphic created with the modular level sets tool followed by several applications of the percolate tool.

The above has described each control being separately executed. In addition, however, the file may be saved as a specified file which includes the ability to execute any and all of these functions. In this embodiment, the pattern file may be saved as a file of type ".ppx".

Figure 34:
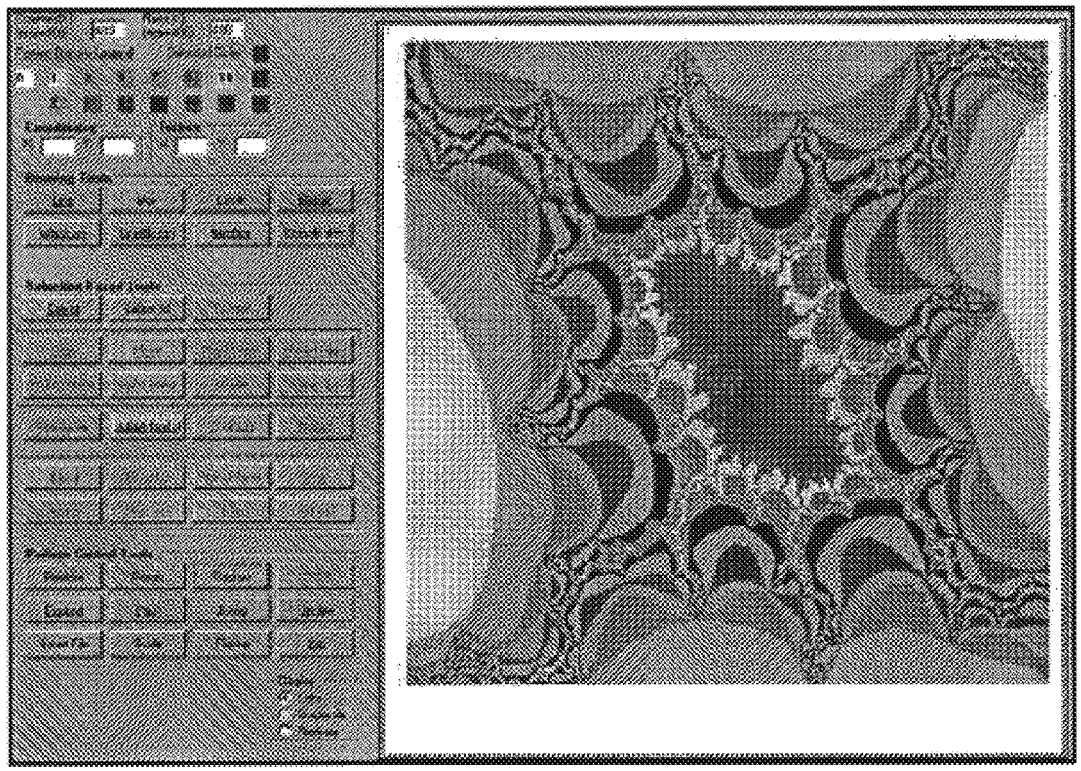
FIGS. 34 and 35 shows the overall drawing tool for the system.
Figure 35:
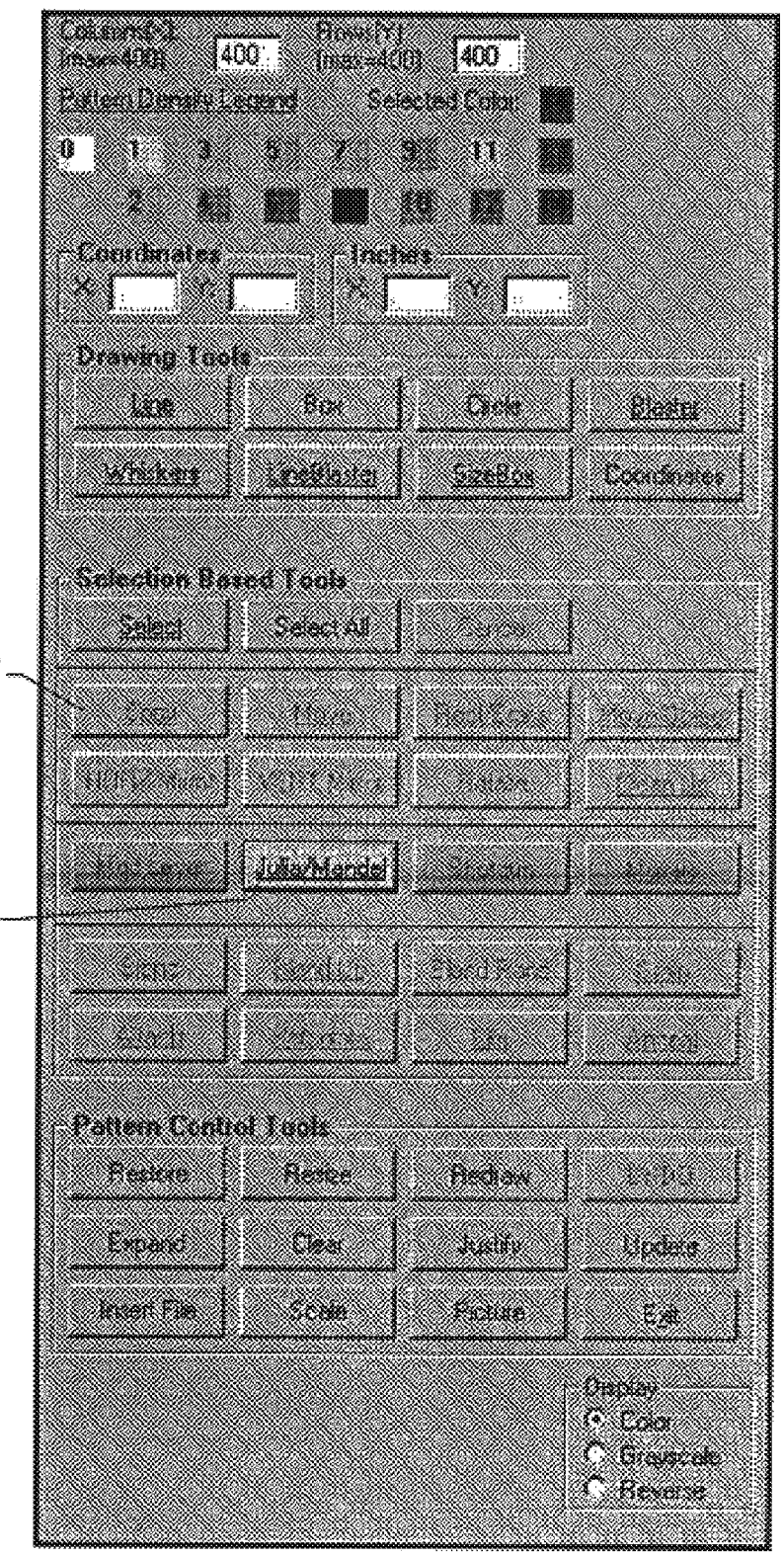

FIGS. 33 through 35 shows controls on the main screen of the overall system used according to the present system. A pattern file 3300 is defined. This may be a file that has been opened, or may be a new file which it being newly presented. The contents of the pattern file, either the newly presented file or the file which is opened, will be used to modify the look of some material e.g. a garment, using a specified marking element such as a laser. In 3310, the operating parameters of the laser are set. This may include the speed of the laser, and the laser scale factor. The pattern may also be scaled in 3315. For example, a small pattern may be created but may be increased in size when it will be written on to the textile material. The pattern dimension on the laser may also be set.

Many fabrics have directional characteristics, e.g. the characteristics of the twill of the fabric. For example, denim includes twills. Therefore, the drawing direction of the laser may affect the way the pattern looks on the material, especially on denim. 3325 sets the drawing direction of the laser. 3330 sets the way the color change is set. The color change may be set either randomly or deterministically. At 3335, the number of drawing directions may be changed. The drawings may be carried out from a number of different characteristics.

As described above, the system assumes that each color in the image that is created represents a power level. The colors may be selectively associated with the power level at 3340. For example, each color is shown such as colors 123 and 4. Each color may also be associated with a power level. Other effects are also shown in FIG. 33. The boundary line is set at 3342. The boundary may be minimized at 3345, and the image may be low pass filtered at 3350. To the extent that random numbers are used, a seed may be entered at 3355. As conventional, the pattern may be edited saved, changed version, or displayed using the user interface control shown as 3360. When the user interface 3365 is called up, this brings up the editing screen shown in FIG. 34. This editing screen enables the image to be seen and changed. A number of the drawing tools described above may also be used. A close-up of these drawing tools is shown in FIG. 35. Note that the FIG. 34 screen shows a pattern based on the Julia/Mandelbrot. Therefore, the selection based tools 3505 are all grayed out, and only the fractal set tool 3510 is shown as being selected. This may also bring up the specific fractal set interface shown in FIG. 13. Each of the pattern control tools described above may also be included in the editing screen.

Although only a few embodiments have been disclosed in detail above, other modifications are possible. For example, while it may be considered preferred to use this system for modifying the look of apartment using laser, it may also be possible to modify the garment using other techniques. Other techniques which are subsumed by this invention may include chemical bleaching or other color altering, screen-printing, and discharge printing. In any of these systems, the image which is produced by the system may be in color, and subsequently associated with power levels a which are used for applying the color changing technique. In one embodiment, the color images themselves may be applied using a printing technique. Different kinds of material handling systems can be used. These material handling systems can include fabric presented as a continuous Web, fabric presented as precut panels, and/or fabric presented as a completed garment.

An advantage of this system is better run of products can be made where all products are precisely the same. Another run can be made where all products are unique to the specified products.

All such modifications are intended to be encompassed within the following claims, in which:

What is claimed is:

1. A method, comprising:
   allowing a user to enter and/or change each of a plurality of different parameters;
   carrying out a mathematical operation based on said parameters to form values which are individualized for each of a plurality of areas; and
   using said values to control a laser to change a look of a textile material according to said values.

2. A method as in claim 1, wherein said mathematical operation includes a fractal operation.

3. A method as in claim 2, wherein said fractal representation includes at least one of a Mandelbrot set and a Julia set.

4. A method as in claim 2, further comprising allowing the user to select specified values associated with the fractal representation.

5. A method as in claim 4 wherein said specified values include minimum and maximum values.

6. A method as in claim 1, wherein said mathematical operation includes cellular automata.

7. A method as in claim 1, wherein said mathematical function includes both a polynomial function and a trigonometric function.

8. A method as in claim 1 wherein said mathematical operation uses a modulus function.

9. A method as in claim 1, wherein said mathematical operation uses an integer function.

10. A method as in claim 1, wherein said mathematical operation includes user changeable parameters, at least one of which is a multiplication parameter, and another of which is an addition parameter.

11. A method as in claim 10, wherein said mathematical operation includes an operation of the form $ax^n + bx^{n-1} \cdots$.

12. A method as in claim 1, wherein said allowing comprises providing the user interface including a plurality of different mathematical options, and allowing the user to select at least one of said mathematical options, and at least one user selectable parameter associated with said at least one mathematical options.

13. A method as in claim 12, wherein said mathematical options include at least a polynomial function, a trigonometric function, and parameters for said polynomial function and said trigonometric function.

14. A method as in claim 12, further comprising allowing selection of scaling of an image using a scale control.

15. A method as in claim 1, wherein said mathematical operation includes processing said parameters using modular level sets.

16. A method as in claim 15, further comprising using said values to form an image indicative of the values on said areas, wherein each pixel is defined as coordinates, and the value of the pixel is defined according to a polynomial function $F(x,y)$.

17. A method as in claim 16, wherein said parameterized function is a trigonometric function.

18. A method as in claim 15, wherein said values are calculated as $MOD[(INT(A*F(X,Y)+B),M]$, where said parameters include at least A, B and M.

19. A method as in claim 18, wherein F is of the form $F = ax^n + bx^{n-1} + \ldots$.

20. A method as in claim 15 wherein said modular level sets are of the form $ax^n + bx^{n-1}$.

21. A method as in claim 20 further comprising using said values to form an image indicative of the values on said areas.

22. A method as in claim 21, wherein said image is formed of pixels, and further comprising allowing pixels in a neighborhood to be blended according to a specified weighting.

23. A method as in claim 22, wherein said specified weighting includes equal weighting for all pixels.

24. A method as in claim 22, wherein said specified weighting comprises weighting of the form $$\frac{\frac{Z1}{W1} + \frac{z2}{w2} + \frac{z3}{w3} \cdots + \frac{zn}{wn}}{N}.$$

25. A method as in claim 22, wherein said blending is carried out based on pixel colors which exist at a beginning time of a blending process.

26. A method as in claim 22, wherein said blending is carried out based on pixel colors as they have been updated at any given point in the blending process.

27. A method as in claim 22, further comprising setting a blanking value which specifies a number of neighboring pixels that must be nonblank before a blank pixel is allowed to be nonblank.

28. A method as in claim 21, wherein said image is formed of pixels, and further comprising finding non blank pixels which have a neighborhood comprised of a specified number of blank pixels, and adjusting the value of said non blank pixels based on said finding said specified number.

29. A method as in claim 28, further comprising allowing setting of said specified number.

30. A method as in claim 29, wherein said adjusting the value comprises changing said non-blank pixels into blank pixels.

31. A method as in claim 21, further comprising modifying said image using an iterative process in which portions of the image are processed based on effects of other iterations in the image.

32. A method as in claim 31, wherein said modifying comprises modifying a color of pixels of the image based on a number of times that the color has been modified during said other iterations.

33. A method as in claim 32, further comprising assigning a weight to each pixel, and increasing said weight based on the number of times that the color of the pixels stays the same.

34. A method as in claim 32, further comprising defining allowable colors for the image.

35. A method as in claim 34, wherein said allowable colors include only those colors which already exist in the image.

36. A method as in claim 34, wherein said modifying comprises modifying the color, finding an interim color, finding an allowable color which is closest to said interim color, and defining each pixel as being said allowable color which is closest to said interim color.

37. A method as in claim 21, wherein said mathematical effect is an effect based on cellular automata.

38. A method as in claim 37, wherein said mathematical effect defines each of the plurality of image areas based on both the image areas and neighbors of the image area.

39. A method as in claim 38, wherein said mathematical effect gives each pixel a highest intensity value based on both said pixel and said neighbors.

40. A method as in claim 39, wherein said mathematical effect comprises, for a given color level, summing weights of pixels in a neighborhood, determining if on actual pixel color has a specified relation to said weights, and continuing said summing until said actual pixel color has said specified relation.

41. A method as in claim 40, wherein said specified relation includes greater than.

42. A method as in claim 40 wherein said specified relation includes less than.

43. A method as in claim 21, further comprising storing effect codes indicative of an effect of the laser on microstructure of a specified fabric, and wherein said image simulates the effect of the laser on the specified fabric.

44. A method as in claim 43, wherein said effect codes represent effects based on a direction of a weave of the fabric.

45. A method as in claim 43, wherein said fabric is denim, and said effect codes are based on the direction of a weave of the denim.

46. A method as in claim 21, further comprising associating each of a plurality of laser power levels with the color of the image.

47. A method as in claim 46 wherein each color is a gray scale value.

48. A method as in claim 46, wherein said laser power level that is associated with a color is an output energy per unit time.

49. A method, comprising:
allowing a user to enter and/or change each of a plurality of different parameters;
carrying out a mathematical operation based on said parameters to form values which are individualized for each of a plurality of areas;
using said values to control a laser to change a look of a textile material according to said values; and
wherein said values represent amounts of change to be caused to said textile material, and are calculated according to said mathematical operation.

50. A method as in claim 49, wherein said values represent an amount of energy to be delivered by said laser for a specified unit of textile material.

51. A method as in claim 49, wherein said values represent an amount of energy to be delivered by said laser per unit time to said textile material.

52. A laser processing system, comprising:
a user interface, indicating entry elements allowing a user to enter and/or change each of a plurality of different parameters and displaying said parameters;
a processor, receiving said parameters, and carrying out a mathematical operation based on said parameters, and carrying out a mathematical operation based on said parameters to form values which are individualized for each of a plurality of areas and uses said values to control a laser to change a look of a textile according to said values.

53. A system as in claim 52, wherein said values represent an amount of energy to be delivered by said laser for a specified unit of textile material.

54. A system as in claim 52 wherein said mathematical operation uses a modulus function.

55. A system as in claim 52, wherein said mathematical operation uses an integer function.

56. A system as in claim 52, wherein said mathematical operation includes user changeable parameters, at least one of which is a multiplication parameter, and another of which is an addition parameter.

57. A system as in claim 56, wherein said mathematical operation includes an operation of the form $ax^n+bx^{n-1} \ldots$.

58. A system as in claim 52 wherein said user interface allows a user to select between at least a fractal mathematics set, a cellular automata mathematics set or a modular level sets mathematics set.

59. A system as in claim 58, wherein said specified values include minimum and maximum values.

60. A system as in claim 52, further comprising using said values to form an image indicative of the values on said areas.

61. A system as in claim 60, wherein said processor creates an image using said parameters and cellular automata mathematics.

62. A system as in claim 60, wherein each pixel is defined as coordinates, and a value of the pixel is defined according to a polynomial function F(x,y).

63. A system as in claim 62, wherein said parameterized function is a trigonometric function.

64. A system as in claim 60, wherein said mathematical function includes both a polynomial function and a trigonometric function.

65. A system as in claim 60, wherein said values represent an amount of energy to be delivered by said laser per unit time to said textile material.

66. A system as in claim 60, wherein said allowing comprises providing the user interface including a plurality of different mathematical options, and allowing the user to select at least one of said mathematical options, and at least one user selectable parameter associated with said at least one mathematical options.

67. A system as in claim 66 wherein said mathematical options include at least a polynomial function, a trigonometric function, and parameters for said polynomial function and said trigonometric function.

68. A system as in claim 66, further comprising allowing selection of scaling of an image using a scale control.

69. A system as in claim 60, wherein said image is formed of pixels, and wherein said processor processes said image to find non blank pixels which have a neighborhood comprised of a specified number of blank pixels, and adjust a value of said non blank pixels based on said finding said specified number.

70. A system as in claim 69 wherein said user interface also allows setting of said specified number.

71. A system as in claim 70, wherein said processor adjust the pixels by changing said non-blank pixels into blank pixels.

72. A system as in claim 60, wherein said processor creates an image using a fractal image based on said parameters.

73. A system as in claim 72, wherein said fractal representation includes at least one of a Mandelbrot set and a Julia set.

74. A system as in claim 72, wherein said user interface allows a user to select specified values associated with the fractal representation.

75. A system as in claim 60, wherein said processory creates an image using said parameters using modular level sets.

76. A system as in claim 75, wherein said modular level sets are of the form $ax^n+bx^{n-1}$.

77. A system as in claim 75, wherein said values are calculated as MOD[(INT(A*F(X,Y)+B),M], where said parameters include at least A, B and M.

78. A system as in claim 77, wherein F is of the form $F=ax^n+bx_{n-1}+ \ldots$.

79. A system as in claim 60, wherein said image is formed of pixels, and wherein said processor carries out an operation to allow pixels in a neighborhood to be blended according to a specified weighting.

80. A system as in claim 79, wherein said specified weighting includes equal weighting for all pixels.

81. A system as in claim 79, wherein said specified weighting comprises weighting of the form $$\frac{\frac{Z1}{W1} + \frac{z2}{w2} + \frac{z3}{w3} \cdots + \frac{zn}{wn}}{N}.$$

82. A system as in claim 79, wherein said blending is carried out based on pixel colors which exist at a beginning time of a blending process.

83. A system as in claim 79, wherein said blending is carried out based on pixel colors as they have been updated at any given point in the blending process.

84. A system as in claim 79, further comprising setting a blanking value which specifies a number of pixels that must be nonblank before a blank pixel is allowed to be nonblank.

85. A system as in claim 60, wherein said processor modifies said image using an iterative process in which portions of the image are processed based on effects of other iterations in the image.

86. A system as in claim 85, wherein said modifying comprises modifying a color of pixels of the image based on a number of times that the color has been modified during said other iterations.

87. A system as in claim 86, wherein said processor assigns a weight to each pixel, and increasing said weight based on the number of times that the color of the pixels stays the same.

88. A system as in claim 86, further comprising a memory storing allowable colors for the image.

89. A system as in claim 88, wherein said allowable colors include only those colors which already exist in the image.

90. A system as in claim 60, wherein said processor carries out said mathematical effect by giving each pixel a highest intensity value based on both said pixel and said neighbors.

91. A system as in claim 90, wherein said processor carries out said mathematical effect by, for a given color level, summing weights of pixels in a neighborhood, determining if on actual pixel color has a specified relation to said weights, and continuing said summing until said actual pixel color has said specified relation.

92. A system as in claim 91, wherein said specified relation includes greater than.

93. A system as in claim 91, wherein said specified relation includes less than.

94. A system as in claim 60, further comprising a memory storing effect codes indicative of an effect of the laser on microstructure of a specified fabric, and said processor uses said effect codes to simulate an effect of the laser on the specified fabric.

95. A system as in claim 94, wherein said effect codes represent effects based on a direction of a weave of the fabric.

96. A system as in claim 95, wherein said fabric is denim, and said effect codes are based on the direction of a weave of the denim.

97. A system as in claim 60, wherein said processor associates each of a plurality of laser power levels with a color of the image.

98. A system as in claim 97, wherein each color is a gray scale value.

99. A method of processing a textile material, comprising:
    allowing a user to enter parameters to be used as part of a mathematical function;
    using said values to calculate an image that is based on said values and that simulates an effect that a laser controlled according to said mathematical function will have on a textile material; and
    displaying said image on the user interface.

100. A method as in claim 99, wherein said mathematical function is a fractal function.

101. A method as in claim 99, wherein said mathematical function is a modular level set function.

102. A method as in claim 99, wherein said mathematical function is a cellular automata function.

103. A method as in claim 99, further comprising controlling a laser, using said values, to produce said effect on a textile material.

104. A method as in claim 99, further comprising further processing said image using an iterative function.

105. A system, comprising:
    a computer;
    a user interface which accepts input values and carries out a mathematical function based on said input values and displays a simulated image based on said input values, and produces output signals indicative of said image; and
    a controlled laser, producing an output power at different controlled positions which is dependent on values of said image.

106. A system as in claim 105, wherein said mathematical function is a fractal function.

107. A system as in claim 105, wherein said mathematical function is a modular level sets function.

108. A system as in claim 105, wherein said mathematical function is a cellular automata function.

109. A method, comprising:
    obtaining parameters associated with a fractal function;
    using said parameters along with said fractal function to calculate values of picture elements and locations for said picture elements;
    displaying an overall image that is based on said picture elements and locations; and
    using said values of picture elements and locations to control an automated system to change a look of a textile material according to said image.

110. A method as in claim 109, wherein said using comprises controlling a laser to apply different power levels according to said image, wherein each part of the image represents a different laser power level.

111. A method, comprising:
    obtaining parameters associated with a modular level set function;
    using said parameters along with said modular level set function to calculate values of picture elements and locations for said picture elements;
    displaying an overall image that is based on said picture elements and locations; and
    using said picture elements and locations to control an automated laser system to change a look of a textile material according to said image.

112. A method as in claim 111, wherein said using comprises controlling a laser to apply different power levels according to said image, wherein each part of the image represents a different laser power level.

113. A method, comprising:
    obtaining parameters associated with a cellular automata function;
    using said parameters along with said cellular automata function to calculate values of picture elements and locations for said picture elements;
    displaying an overall image that is based on said picture elements and locations; and using said picture elements and locations to control an automated laser system to change a look of a textile material according to said overall image.

114. A method as in claim 113, wherein said using comprises controlling a laser to apply different power levels according to said image, wherein each part of the image represents a different laser power level.

115. A method, comprising:

displaying a user interface indicative of a plurality of parameters which can be entered as to form a fractal pattern;

at a specified time and in response to a specified cue, forming a display indicative of a simulated image of said parameters forming said fractal pattern on a specified type of material; and forming an output signal adapted for driving a laser processing unit to produce said fractal pattern on said specified material.

116. A method as in claim 115, wherein said fractal pattern is one of a Julia fractal set or a Mandelbrot fractal set.

117. A method as in claim 115, wherein said forming comprises forming an output signal for driving a laser.

118. A method as in claim 115, wherein said forming comprises producing an output signal for driving an automated printing technique.

* * * * *